United States Patent [19]

Rabiner et al.

[11] 4,092,493

[45] May 30, 1978

[54] SPEECH RECOGNITION SYSTEM

[75] Inventors: Lawrence Richard Rabiner, Berkeley Heights; Marvin Robert Sambur, Randolph Township, Morris County, both of N.J.

[73] Assignee: Bell Telephone Laboratories, Incorporated, Murray Hill, N.J.

[21] Appl. No.: 746,106

[22] Filed: Nov. 30, 1976

[51] Int. Cl.$^2$ .............................................. G10L 1/00
[52] U.S. Cl. ................................................. 179/1 SD
[58] Field of Search .............. 179/1 SA, 1 SB, 1 SD; 340/146.3 WD

[56] References Cited

U.S. PATENT DOCUMENTS

| | | | |
|---|---|---|---|
| 3,225,141 | 12/1965 | Dersch | 179/1 SB |
| 3,238,303 | 3/1966 | Dersch | 179/1 SB |
| 3,499,987 | 3/1970 | Focht | 179/1 SD |
| 3,553,372 | 1/1971 | Wright | 179/1 ST |
| 3,700,815 | 10/1972 | Doddington et al. | 179/1 SB |
| 3,816,722 | 6/1974 | Sakoe et al. | 179/1 SD |
| 3,940,565 | 2/1976 | Lindenberg | 179/1 SA |
| 3,943,295 | 3/1976 | Martin | 179/1 SA |

OTHER PUBLICATIONS

F. Itakura, "Minimum Prediction Residual Principle," IEEE Trans. on A, S, and SP, Feb. 1975.
G. White, et al., "Speech Recognition Experiments with Linear Prediction IEEE Trans. on A, S, SP, Apr. 1976.
G. White, "Speech Recognition," Computer, May, 1976.
Cannon, M., "A Method of Analysis and Recognition for Voiced Vowels," IEEE, Trans. on Audio and EA, Jun., 1968.

Primary Examiner—Kathleen H. Claffy
Assistant Examiner—E. S. Kemeny
Attorney, Agent, or Firm—J. S. Cubert

[57] ABSTRACT

An unknown segment such as a spoken digit in a continuous speech signal is recognized as a previously identified speech segment by deriving a set of test linear prediction characteristic signals from the voiced interval of the unknown segment. The test signals are time aligned to the average voiced interval of repetitions of each of a plurality of identified speech segments for which average reference voiced interval linear prediction characteristic signals were previously generated. The correspondence between the aligned test signals and the reference signals is determined. The unknown speech segment is identified as the reference segment having the closest correspondence with the unknown segment. Features of the invention include: voiced-region parameter signals, and classification and consistency detection; and determining means and variances of voiced-region parameters from a plurality of speakers utilized for the correspondence arrangements.

15 Claims, 16 Drawing Figures

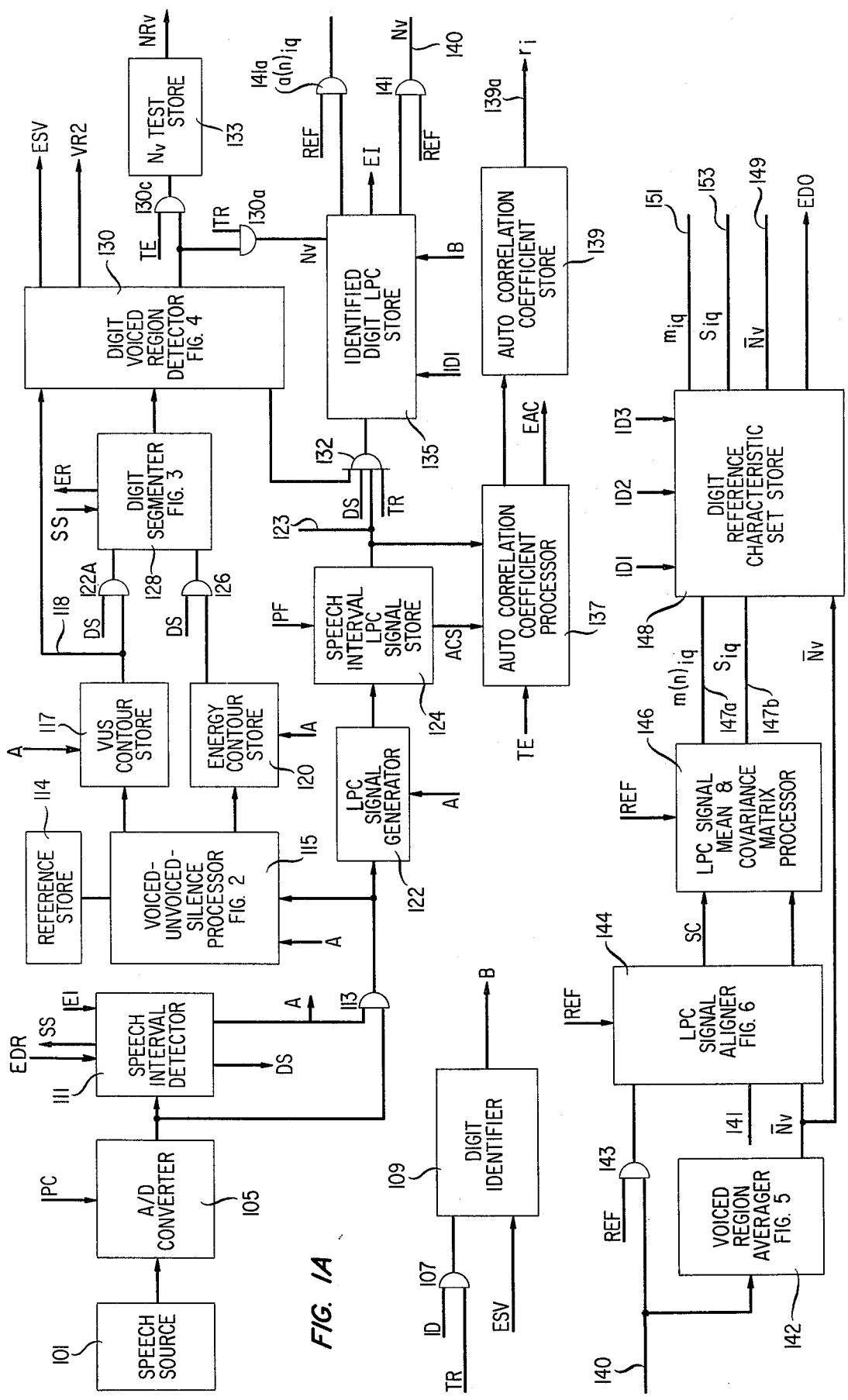
FIG. IA

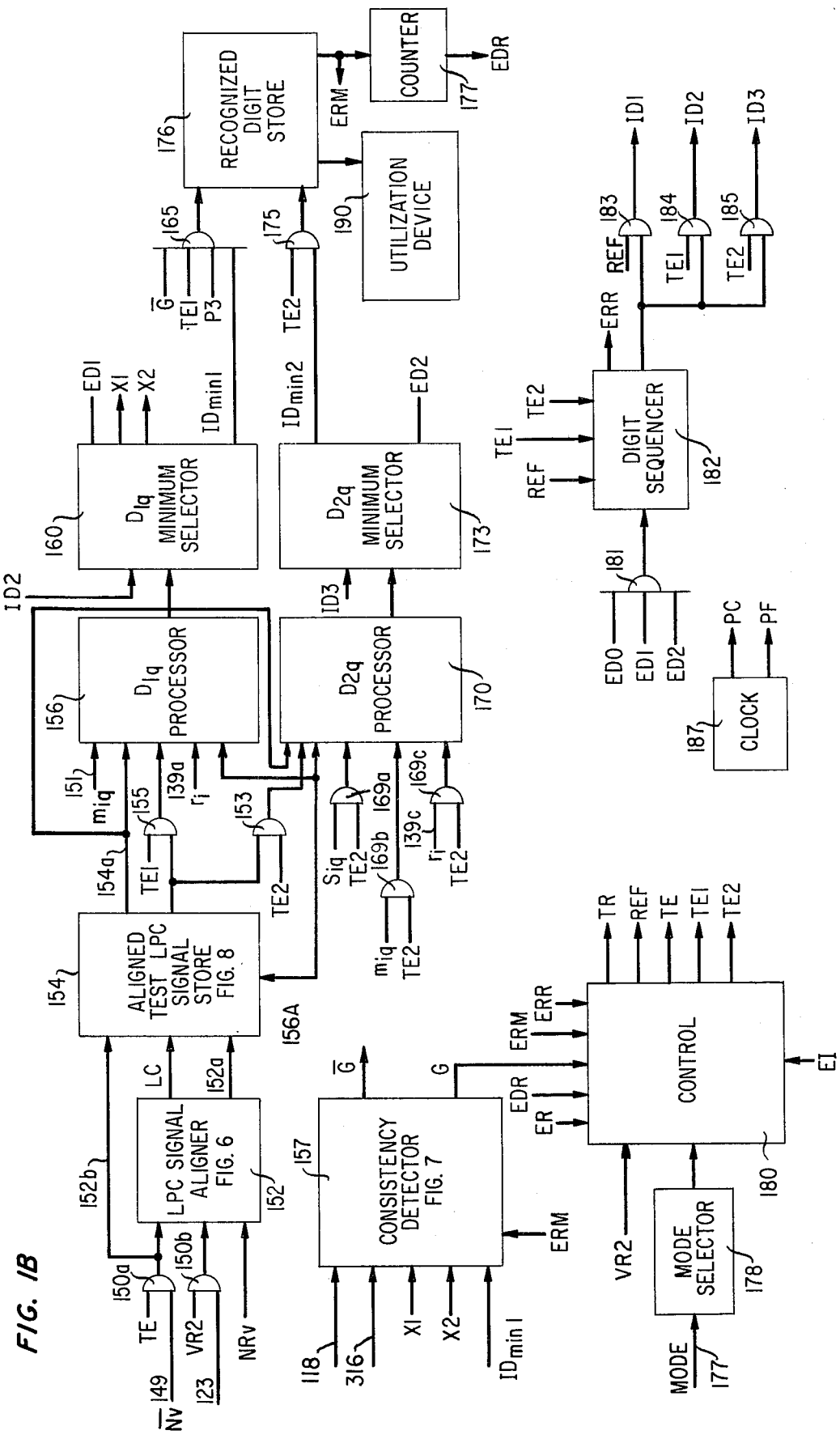
FIG. IB

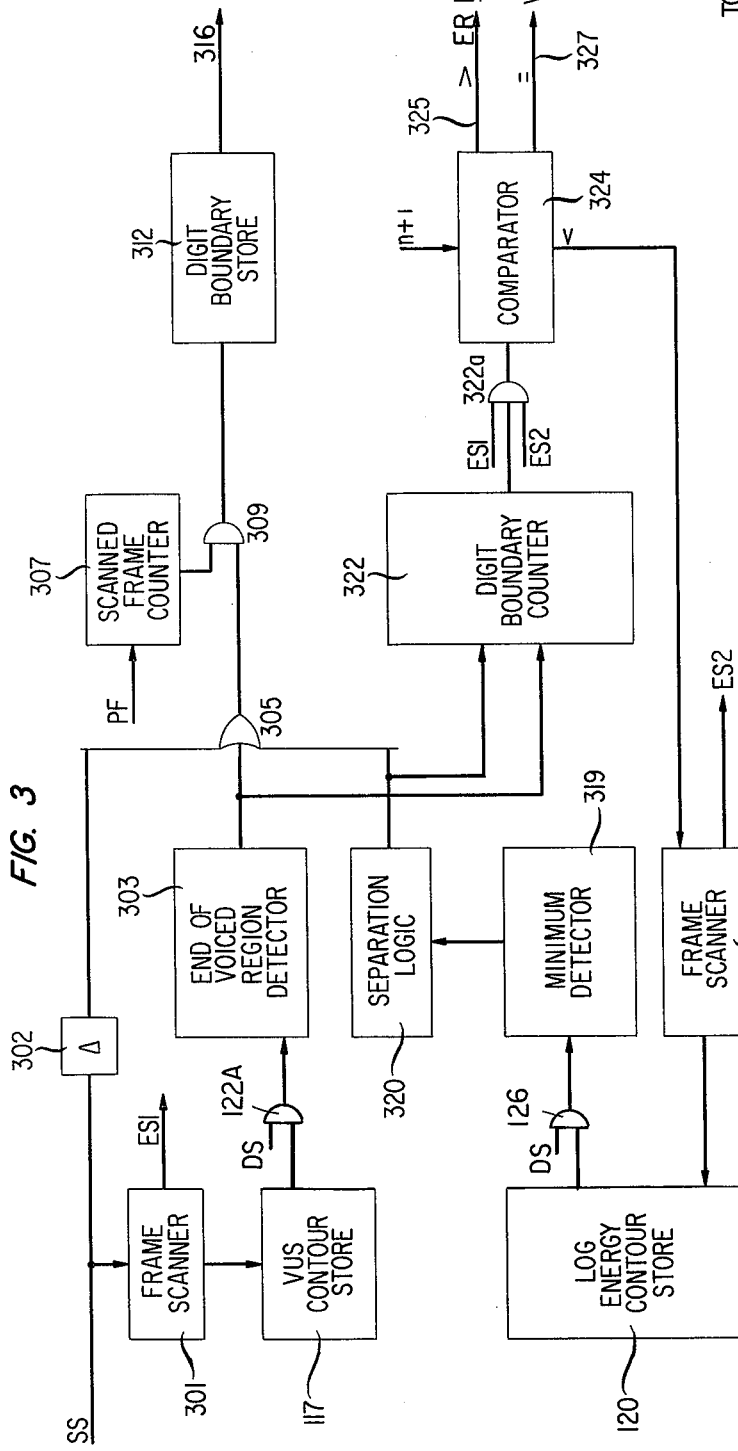
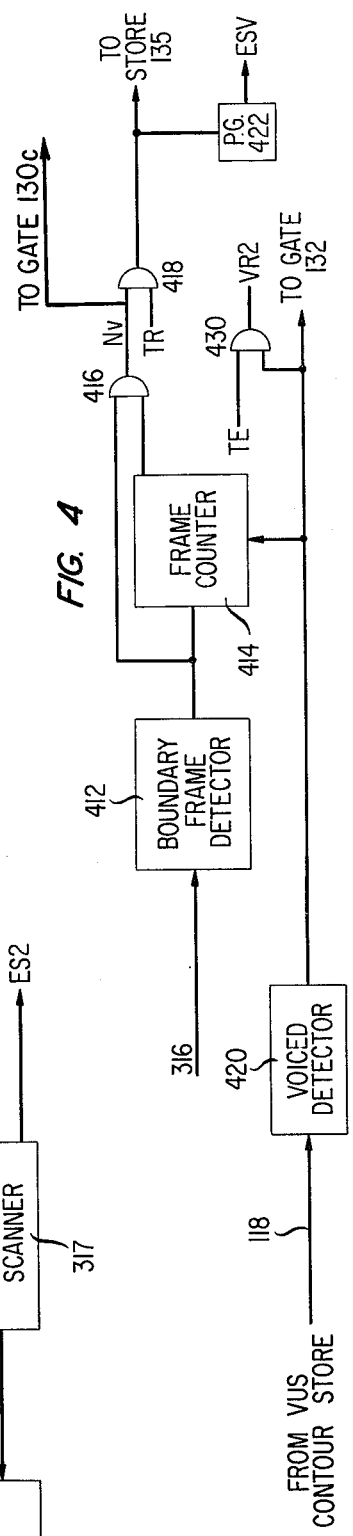
FIG. 3
FIG. 4

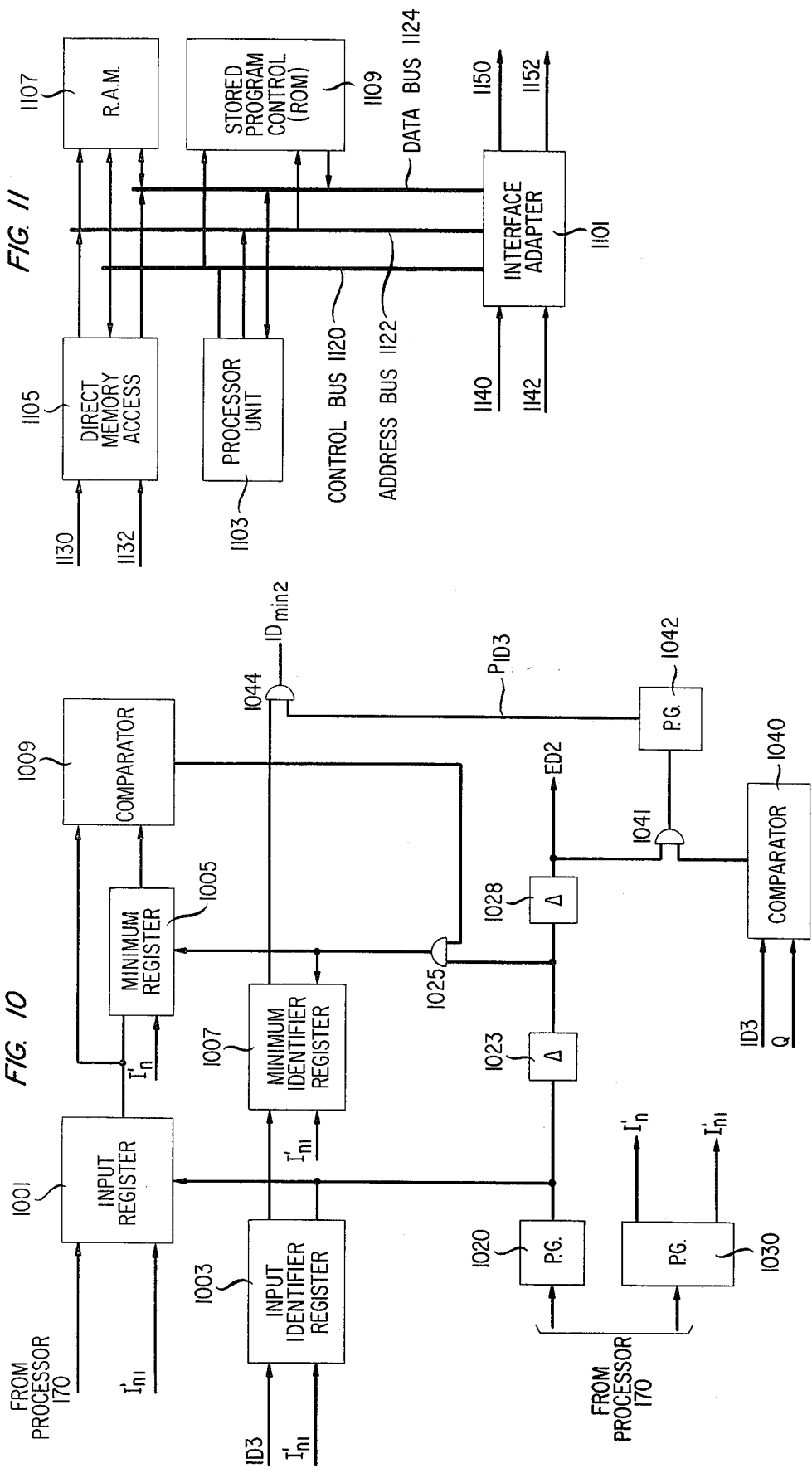

SPEECH RECOGNITION SYSTEM

BACKGROUND OF THE INVENTION

Our invention relates to speech recognition and more particularly to an arrangement for recognizing prescribed speech segments in continuous speech.

In communication, data processing and control systems, it is often desirable to utilize speech as direct input for data, commands, or other information. Speech input arrangements may be utilized to record transactions, to record and request telephone call information, to control machine tools, or to permit a person to interact with data processing and control equipment without diverting his attention from other activity. Because of the complex nature of speed, its considerable variability from speaker to speaker and variability even for a particular speaker, it is difficult to attain perfect recognition of speech segments.

One type of priorly known speech recognition system converts an input speech signal into a sequence of phonetically based features. The derived features, generally obtained from a spectral analysis of speech segments, are compared to a stored set of reference features corresponding to the speech segment or word to be recognized. If an input speech segment meets prescribed recognition criteria, the segment is accepted as the reference speech segment. Otherwise it is rejected. The reliability of the recognition system is thus highly dependent on the prescribed set of reference features and on the recognition criteria. Where the set of reference features are obtained from the same speaker and the word to be recognized is spoken in isolation, the speech recognition system is relatively simple and may be highly accurate.

Another type of speech recognition system disclosed in the article "Minimum Prediction Residual Principle Applied to Speech Recognition," by Fumitada Itakura in the *IEEE Transactions on Acoustics, Speech, and Signal Processing*, February 1975, pages 67–72, does not rely on a prescribed set of spectrally derived phonetic features but instead obtains a sequence of vectors representative of the linear prediction characteristics of a speech signal and compares these linear prediction characteristic vectors with a corresponding sequence of reference vectors representative of the linear prediction characteristics of a previous utterance of an identified speech segment or word. As is well known in the art, linear prediction characteristics include combinations of a large number of speed features and thus can provide an improved recognition over arrangements in which only a limited number of selected spectrally derived phonetic features are used.

The linear prediction recognition system of Itakura requires that the same speaker provide the reference speech segment as well as the speech segment to be identified and also requires that the speech segment be spoken in isolation. In continuous speech, however, the prediction characteristics of each segment are dependent on the preceding and following speech segments. Therefore, the successful recognition of an identified speech segment or word in a continuous speech sequence is limited. The technique of Itakura further requires the use of the prediction characteristics of the entire speech segment for recognition. It has been found, however, that the use of the unvoiced region prediction parameters for speech segment recognition severely limits its accuracy.

It is an object of the invention to provide an improved speech recognition arrangement for recognizing speech segments in continuous speech on the basis of linear prediction characteristics of prescribed regions of a continuous speech signal.

BRIEF SUMMARY OF THE INVENTION

Our invention is directed to a speech recognition arrangement in which a set of reference characteristic signals representative of the mean value prediction parameters of prescribed intervals of repeated identified speech segments are generated. Responsive to an unknown speech signal, a set of test signals representative of the linear prediction parameters of prescribed intervals of an unknown speech segment are generated. The test signals are time aligned to the average prescribed intervals of the reference signals. Jointly responsive to the time aligned test set and the identified reference set, a signal representative of the correspondence between said time aligned test set and the reference set is produced to recognize the unknown speech segment.

According to one aspect of the invention, a plurality of sets of reference characteristic signals each representative of the means and covariance of the prediction parameters of prescribed voiced intervals of repeated identified speech segments are generated. Jointly responsive to the time aligned test set and each reference set, a signal representative of the correspondence between said time aligned test set and the reference set is produced. The reference set having the closest correspondence with the time aligned test set is selected whereby the unknown speech segment is recognized.

According to another aspect of the invention, each set of reference signals is generated from a prediction analysis of identified speech segments repetitively spoken by one or more speakers. A set of linear prediction parameter signals of each spoken identified speech segment is generated and stored, together with a signal corresponding to the voiced interval of the identified speed segment. Responsive to the voiced interval signals of the speakers, an average voiced interval signal is generated and the identified speed segment prediction signals of each speaker are aligned to said average voiced interval. Responsive to the aligned prediction parameter signals, a signal representative of the mean of said aligned prediction parameter signals and a signal corresponding to the variance of said aligned prediction parameter signals are generated and stored together with the average voiced interval signal. In this manner, a plurality of reference signals for the identified speech segments to be recognized is obtained.

According to another aspect of the invention, the linear prediction parameter signals of an unidentified speech segment are obtained from a speech signal and are stored together with a signal corresponding to the voiced interval of said speech segment. For each identified speech segment, the linear prediction signals of the voiced interval of the unidentified speech segment are linearly warped to correspond to the stored average voiced interval of the reference identified segment, and a signal representative of the correspondence of the warped prediction parameters of the unidentified speech segment and the average prediction parameters of the identified speech segment is generated. The minimum correspondence signal is selected whereby the unidentified speech segment is recognized.

In an embodiment illustrative of the invention, the digits of a string of spoken digits are recognized on the basis of the linear prediction parameters of the voiced regions. Responsive to an unidentified string of spoken digits, a set of linear prediction parameter signals is formed for the voiced region of each digit and a signal corresponding to the duration of said voiced region is also formed. The set of voiced region prediction parameter signals for each unidentified digit is compared to a set of stored reference prediction parameter signals for every possible digit after the unidentified digit prediction parameter signals are linearly warped to the duration of the reference set voiced region. A signal representative of the correspondence of the linearly warped prediction parameter signals of the unidentified digit to the reference digit prediction parameter signals is formed for each reference digit. The minimum value correspondence signal is then selected whereby the unidentified digit is recognized.

The reference digit prediction parameter signals are formed from a plurality of sets of identified spoken digit strings obtained from one or more speakers. Responsive to each identified spoken digit string, the prediction parameter signals of each digit voiced region are generated and stored together with a signal representative of the duration of said digit voiced region. After a predetermined number of identified prediction parameter signals are stored, the average voiced region duration signal is generated for each identified digit. The prediction parameter signals for the identified digit voiced region are then time aligned to the identified average voiced region duration and the means and variances of the time aligned prediction parameter signals are produced and stored. In this manner a set of reference signals for each possible spoken digit is generated and stored for use in the recognition of unidentified digits.

Prior to the formation of voiced region prediction parameters, the digit string is segmented into its component digits by generating and storing a signal corresponding to the voiced-unvoiced-silence interval contour of the digit string and a signal corresponding to the log energy contour of the digit string as disclosed in the article "A Pattern Recognition Approach to Voiced-Unvoiced Silence Classification with Application to Speech Recognition" by B. S. Atal and L. R. Rabiner, *IEEE Transactions on Acoustics, Speech, and Signal Processing*, Vol. ASSP-24, No. 3, June 1976 at pages 201-212. The stored voiced-unvoiced-silence contour is scanned to detect the end points of the voiced intervals in the contour.

The number of end points plus the start point of the speech interval (boundaries) is counted and compared to $n + 1$ where $n$ is the number of digits in the string. Responsive to the number of boundaries being equal to $n + 1$, the boundaries are stored as the digit segmentation boundaries. If the number of boundaries exceeds $n + 1$, a repetition of the digit string is requested. Where the number of boundaries obtained from the scan of the voiced-unvoiced silence contour is less than $n + 1$, the log energy contour is scanned to detect the log energy minima which are spaced at least a predetermined interval apart. The log energy minima are then identified as boundary points in ascending order until the number of boundary points is equal to $n + 1$. In this manner the digits in the spoken digit string are segmented and the voiced interval of each segmented digit is selected from the stored voiced-unvoiced silence contour signal and the digit segmentation boundary.

BRIEF DESCRIPTION OF THE DRAWING

FIGS. 1 and 1B depicts an overall block diagram of a digit recognition system illustrative of the invention;

FIG. 3 shows a detailed block diagram of a digit segmentation circuit useful in FIG. 1A;

FIG. 4 shows a detailed block diagram of the digit voiced interval detector of FIG. 1A;

FIG. 10 shows a detailed block diagram of the $D_{2q}$ minimum selector of FIG. 1B;

FIG. 11 shows a block diagram of a microprocessor useful in the recognition system of FIGS. 1A and 1B, and FIGS. 12-15 show waveforms useful in describing the operation of the digit recognition system of FIGS. 1A and 1B.

DETAILED DESCRIPTION

Figure 2:
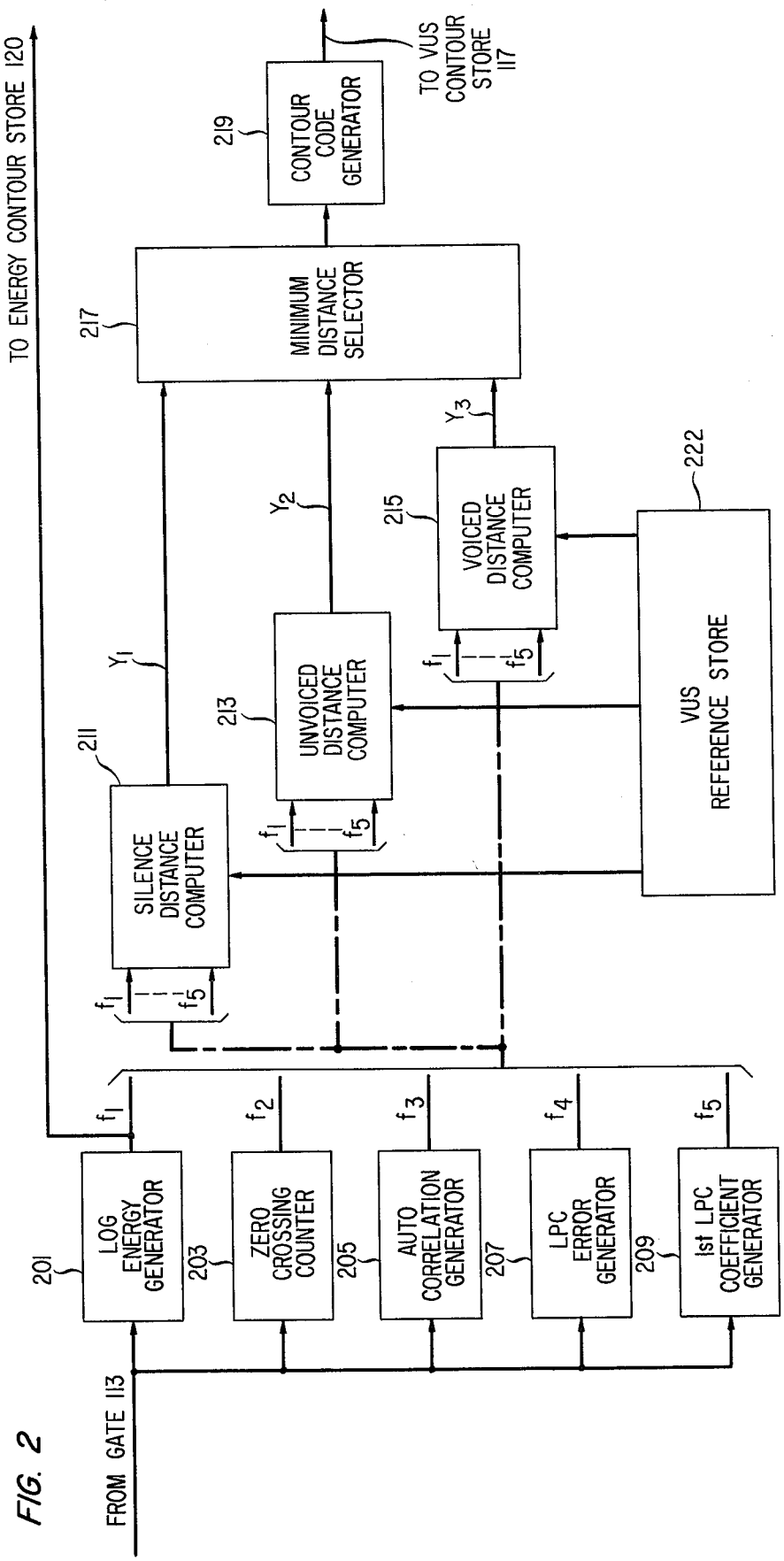
FIG. 2 shows a detailed block diagram of a voiced-unvoiced silence processor useful in FIG. 1A.

A speech recognition arrangement illustrative of the invention is shown in FIGS. 1A and 1B. The system of FIGS. 1A and 1B is operative to recognize the digits of a string of unidentified spoken digits on the basis of a correspondence between the linear prediction coefficient signals of the voiced region of each unidentified digit of the string with a previously stored reference set of linear prediction coefficient signals for each possible digit. The reference sets are derived from a statistical analysis of the linear prediction characteristics of repeated identified digit strings obtained from one or more speakers.

The system of FIGS. 1A and 1B first operates in a training mode, during which sets of linear prediction coefficient signals are derived from identified digit speech samples. After a predetermined number of linear prediction coefficient signals of the identified digit are stored, a reference mode is initiated during which the stored training sets of linear prediction coefficient signals are combined to form a reference set for each possible digit to be recognized. The stored reference sets are then utilized in a recognition mode to identify the digits of a string of unidentified digits.

In the recognition mode, linear prediction coefficient signals for the voiced region of each unidentified digit are derived and these derived linear prediction coefficient signals are compared to the reference set for each possible digit. The results of the comparison are stored and the digit having the closest correspondence to the unidentified digit is selected.

For purposes of illustration, assume that control logic 180 in FIG. 1B places the recognition system of FIGS. 1A and 1B in its training mode by generating output signal TR responsive to the state of mode selector 178 in FIG. 1B. Signal TR shown in waveform 1301 of FIG. 13 enables gate 107 so that an identification code ID for each digit in the training set string is inserted into digit identifier 109. Speech source 101 in FIG. 1A produces a speech signal consisting of the string of identified digits whose identities are stored in digit identifier 109. The string from source 101 is applied to analog-to-digital converter 105. Speech source 101 may comprise a microphone or a telephone handset or other electroacoustic device.

Analog-to-digital converter 105 in FIG. 1A is operative to low-pass filter the input digit string speech signal from source 101 and to sample the filtered speech signal at a 10 kHz rate under control of 10 kHz rate clock pulses PC from clock 187 in FIG. 1B. The output of converter 105 is a sequence of coded sample signals $s_n$, which signals are applied to speech interval detector 111 and to one input of gate 113 in FIG. 1A.

Responsive to the energy content of the speech signal obtained from a summation of the absolute values of the sampled outputs from converter 105, speech interval detector 111 in FIG. 1A is operative to provide an enabling signal A (waveform 1303 of FIG. 13) to gate 113. At the end of the speech signal, the output of detector 111 changes to inhibit gate 113 and also provides an enabling signal DS (waveform 1305 of FIG. 13) to gates 122A, 126, and 132. A speech interval detector suitable for use in FIG. 1A is disclosed in L. R. Rabiner et al U.S. Pat. No. 3,909,532, issued Sept. 30, 1975, and assigned to the same assignee.

During the speech interval, the signal samples $s_n$ from converter 105 are applied to the input of Linear Prediction Coefficient (LPC) generator 122 in FIG. 1A and to the input of voiced-unvoiced-silence (VUS) processor 115 in FIG. 1A. In LPC generator 122, the samples $s_n$ are stored in blocks or frames of 200 coded signals $s_1$ through $s_{200}$. It is to be understood that other frame arrangements may be used. A linear prediction analysis of the sampled speech signal is made in accordance with $$s_n = \sum_{i=1}^{p} a(i) s_{n-i} \quad (1)$$

where $n = 1, 2, \ldots, 200$ and $p$ is the number of poles of the prediction analysis model. The linear prediction analysis is based on the all-pole linear prediction filter model well known in the art and described in "Speech Analysis and Synthesis by Linear Prediction of the Speech Wave," by B. S. Atal and S. L. Hanauer, *Journal of Acoustic Society of America*, Vol. 50, pp. 637–655, 1971. For purposes of speech recognition, it has been found that a 12-pole filter model is adequate. It is to be understood, however, that other pole arrangements may be used.

The linear prediction coefficients $a(i)$, are the coefficients of the sampled speech signal $s_n$ in accordance with the representation of Equation (1). For the 12-pole filter model used in FIG. 11, the coefficients $a(1)$ through $a(12)$ are generated in LPC generator 122 in each frame of 200 samples by the auto correlation method of linear prediction analysis in accordance with Equations (2) and (3).

$$y_k = \sum_{n=1}^{N} s_{n-k} s_n \quad k = 1, 2, \cdots, p \quad (2)$$

$$y_k = \sum_{i=1}^{p} a(i) y_{1i-k1} \quad k = 1, 2, \cdots, p \quad (3)$$

where N is the number of samples in each frame (N = 200) and $p = 12$. As is well known in the art, the linear prediction coefficients $a(i)$ of Equation (1) are chosen to minimize the mean squared prediction error in accordance with Equation (2) and (3). As set forth in Equation (2), this is done by an autocorrelation analysis of the block of sample signals $s_n$ through $s_{n+N}$. The resulting linear prediction coefficients $a(1)$ through $a(12)$ are obtained for each frame of N speech samples.

Linear prediction coefficient generator 122 may be the prediction parameter computer shown and described in U.S. Pat. No. 3,631,520 of B. S. Atal, issued Dec. 28, 1971, and assigned to the same assignee. This computer arrangement produces linear prediction parameters in accordance with the covariance method well known in the art. Alternatively, any computer, such as the PDP 11 or Nova 800, or, preferably, a microprocessor such as the Data Generator Micro Nova Computer, the Intel 8080 microprocessor or the Motorola 6800 microprocessor, on which the Fortran language program of Appendix A of "Formant Trajectory Estimation from a Linear Least Squared Inverse Filter Formulation," by John D. Markel, Speech Communications Research Laboratory, Inc., Monograph No. 7, October 1971, can be implemented, may be used. This Fortran program is based on the autocorrelation method well known in the art. Each frame is 20 ms in duration and, as is readily apparent, the coefficients $a(1)$ through $a(12)$ of the frame are availagle at the output of generator 122 at the end of the frame of the corresponding samples $s_1$ through $s_{200}$. Coefficient signals $a(1)$ through $a(12)$ derived from either the covariance or autocorrelation method may be used in the arrangement of FIGS. 1A and 1B.

FIG. 11 shows a block diagram of a microprocessor well known in the art which may be used as LPC signal generator 122 of FIG. 1A. In FIG. 11, control is provided by stored program control 1109 which comprises a read only memory (ROM) constructed to perform with the Fortran Program listing of Appendix A of the aforementioned Markel article by means of a microprocessor Fortran compiler, well known in the art. Random access memory (RAM) 1107 receives data information from direct memory access 1105 and interface adapter 1101 via data bus 1124 and also receives addressing information from direct memory access 1105 and processor unit 1103 via address bus 1122. Computation is performed by processor 1103 in accordance with the permanently stored program in stored program control 1109. Control of the microprocessor is provided by processor unit 1103 via control bus 1120 which is connected to direct memory access 1105, RAM 1107, stored program control ROM 1109 and interface adapter 1101.

Interface adapter 1101 receives input control information and data from input lines 1140 and 1142 for use by RAM 1107 and processor unit 1103; and also transmits output data and output control data from RAM 1107 and processor unit 1103 to output lines 1150 and 1152. The microprocessor and its component parts are described in "Technical Reference Micronova Computer Systems — 014-000073-00," "User's Manual Programmers Reference Micronova Computers 015-000050-00" and "Technical Reference Micronova Integrated Circuits 014-000074-00" all copyrighted 1975 by Data General Corporation or in "Microprocessor Applications Manual" by Motorola Semiconductor Products, Inc., published by McGraw Hill Book Company, copyrighted 1975 by Motorola, Inc.

In the microprocessor used as LPC generator 122, the sequential speech sample codes $s_n$ are applied from converter 105 via gate 113 to line 1140 of FIG. 11 and are inserted into interface adapter 1101. Signal A (waveform 1303) from speech interval detector 111 is supplied to interface adapter 1101 via line 1142 so that LPC signals are produced by the microprocessor of FIG. 11 during the speech interval. The LPC signals generated by the microprocessor of FIG. 11 are applied from interface adapter 1101 to LPC store 124 in FIG. 1A via line 1150 in a frame-by-frame sequence.

At the end of every frame of the speech interval, a group of 12 coefficient signals $a(1)$ through $a(12)$ is applied from generator 122 to speech interval LPC store 124 under control of frame clock pulses PF from clock 187. In this manner, the linear prediction coefficient signals of the speech interval comprising the string of identified digits is obtained and stored. Store 124 may comprise a shift register adapted to receive a set of 12 linear prediction coefficient signals for each frame of the speech interval which consists of the string of identified digits. The first and last frames of the speech interval may be marked by an identification code in shift register store 124 for reference. At the end of the speech interval (time $t_1$ in FIG. 13), the linear prediction coefficient signals of the set of training digits are available for use in the formation of reference characteristic signals.

In order to utilize the LPC coefficient signals stored in store 124 for digit recognition in accordance with the invention, it is necessary to segment the speech signal into its component digit intervals, and it is further necessary to identify the occurrence of the voice region of each digit interval. The digit segmentation is performed on the basis of a voice-unvoiced-silence (VUS) region contour of the speech signal. The VUS contour identified each frame of the speech signal as a voice frame, an unvoiced frame or a silence frame. A circuit for generating the voiced-unvoiced-silence contour based on the article "Pattern Recognition Approach to Voiced-Unvoiced-Silence Classification with Application to Speech Recognition," by B. S. Atal and L. R. Rabiner, *IEEE Transactions on Acoustics, Speech and Signal Processing*, Vol. ASSE-24, No. 3, June 1976, pp. 201–212, is shown in FIG. 2.

In FIG. 2, the speech samples $s_1$ through $s_{200}$ of each successive frame are applied from gate 113 to arithmetic generators 201, 203, 205, 207, and 209. Generator 201 comprises an arithmetic unit well known in the art which is operative to form signal $f_1$ in accordance with $$f_1 = 10 \log_{10}(\epsilon + \frac{1}{n} \sum_{n=1}^{n} s_n^2) \tag{4}$$

where $\epsilon$ is a small constant added to prevent computation of $\log_{10} 0$. Since $\epsilon << $ mean squared value of the speech samples, signal $f_1$ is representative of the log energy $E_S$ of the frame comprising speech samples $s_1$ through $s_{200}$. Generator 203 comprises counting and logic circuits and is operative to form signal $f_2$ which is representative of the number of zero crossings in the frame of speech samples $s_1$ through $s_{200}$.

Generator 205 comprises an arithmetic unit operative to form signal $f_3$ which is representative of the normalized autocorrelation coefficient in accordance with $$f_3 = \frac{\sum_{n=1}^{n} s_n s_{n-1}}{\sqrt{\left(\sum_{n=1}^{n} s_n^2\right)\left(\sum_{n=0}^{n-1} s_n^2\right)}} \tag{5}$$

Generator 207 comprises an arithmetic unit operative to form signal $f_4$ which is representative of the normalized prediction error of the frame in accordance with $$f_4 = E_s - 10\log_{10}(10^{-6} + \sum_{k=1}^{p} \alpha(k)\Phi(0,k) + \Phi(0_p)) \tag{6}$$

where $$\Phi(i,k) = \frac{1}{N} \sum_{n=1}^{n} s_{n-i} s_{n-k}$$

the $(i,k)$ term of the covariance matrix of the speech samples, and the $\alpha(k)$s are the predictor coefficients obtained by minimizing the meansquared prediction error $$E = \frac{1}{n} \sum_{n=1}^{n} [s_n + \sum_{k=1}^{p} \alpha(k) s_{n-k}]^2 \tag{7}$$

Generator 209 comprises an arithmetic unit operative to form the first LPC coefficient of the frame in accordance with equation (1).

Computer 211 is operative to generate a signal $y_1$ which is representative of the correspondence between the characteristic signals $f_1$ through $f_5$ and a set of similar reference characteristics obtained from manually segmenting natural speech into regions of silence, unvoiced speech, and voiced speech. The manually obtained characteristics are placed in VUS reference store 222. A vector $$F_1 = (f_1, f_2, f_3, f_4, f_5) \tag{8}$$

is formed in silence distance computer 211 and is compared to the manually obtained training characteristics for silence region $M_s$ stored in reference store 222. This comparison is made on the basis of $$Y_1 = d(F_1, M_s) = (F_1 - M_s)(\lambda_s)^{-1}(F_1 - M_s)' \tag{9}$$

where $M_s$ is the mean reference vector for silence and $\lambda_s$ is the reference covariance matrix for silence stored in reference store 222.

In similar manner, unvoiced distance computer 213 provides a comparison of vector $F_1$ with the stored, manually obtained characteristics of unvoiced speech regions in store 222. The output unvoiced distance computer 213 is a signal $Y_2$ $$Y_2 = d(F_1, M_u) = (F_1 - M_u)(\lambda_u)^{-1}(F_1 - M_u)' \tag{10}$$

where $M_u$ is the mean reference vector for unvoiced speech and $\lambda_u$ is the reference covariance matrix for unvoiced speech stored in reference store 222. Signal $Y_2$ is representative of the correspondence between frame characteristics $f_1$ through $f_5$ and the stored characteristic $M_u$ and $\lambda_u$ from store 222.

Voiced distance computer 215 similarly provides a signal $$Y_3 = d(F_1 - M_v) = (F_1 - M_v)(\lambda_v)^{-1}(F_1 - M_v)^t \qquad (11)$$

which is representative of the correspondence between characteristics $f_1$ through $f_5$ and the stored characteristics of voiced speech $M_v$ and $\lambda_v$ obtained from a manual analysis and placed in store 222. Each of the distance computers and arithmetic units of FIG. 2 may be one of the aforementioned microprocessors shown in FIG. 11.

Signals $Y_1$, $Y_2$, and $Y_3$ are applied from computers 211, 213, and 215, respectively, to minimum distance selector 217.

Figure 12:
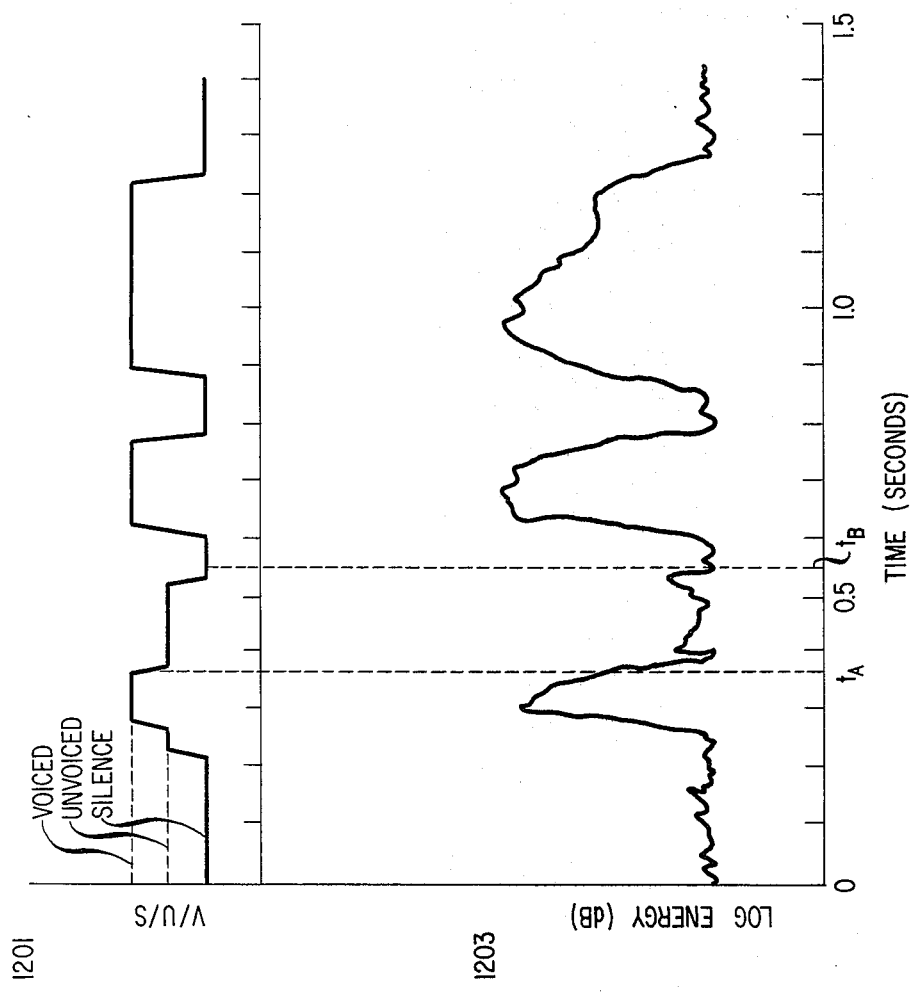

Distance selector 217 comprises logic circuits well known in the art and is operative to select the minimum distance signal of $Y_1$, $Y_2$ and $Y_3$, which minimum distance signal identity is supplied to contour code generator 219. Responsive to the minimum distance signal identity, contour code generator 219 produces a silence code, an unvoiced code or a voiced code, and transfers said produced code to VUS contour store 117. In addition to the VUS contour of the speech signal in store 117, the $f_1$ signal for each 20 millisecond frame which represents the log energy of the frame is placed into energy contour store 120 from log energy generator 201. Waveforms 1201 and 1203 of FIG. 12 illustrate typical VUS and Log energy contours of a three-digit segment (6, 8, 1). These contours are shown in the aforementioned article by B. S. Atel and L. R. Rabiner.

At the end of the speech interval, VUS contour store 117 contains the classification signals of the frames of the speech signal, and energy contour store 120 contains signals representative of the energy content of each of the speech signal frames. Each of these stores may comprise a shift register having a sufficient number of stages to provide storage for the VUS classification of the speech interval frames (typically 200 bits) or the energy representative signals of the speech interval frames.

Preferably, VUS processor 115 may comprise one of the aforementioned microprocessors as shown in FIG. 11 having a stored program control ROM constructed in accordance with the Fortran program listing of Appendix 1. The sequential speech sample codes $s_n$ from converter 105 are applied to interface adapter module 1101 via gate 113 and line 1140 under control of processor unit 1103. Control signal A is supplied from speech interval detector 111 to interface adapter 1101 via line 1142 to enable the VUS microprocessor during the detected speech interval. The microprocessor of FIG. 11 used in VUS processor 115 produces a voiced, unvoiced or silence classification signal on a frame-by-frame basis. The classification signal sequence is supplied to VUS contour store 117 via line 1150. Similarly, the energy signals from the microprocessor of FIG. 11 are supplied from interface adapter 1101 to energy contour store 120 via line 1152. The contour signals are illustrated in waveforms 1201 and 1203 of FIG. 12.

Figure 13:
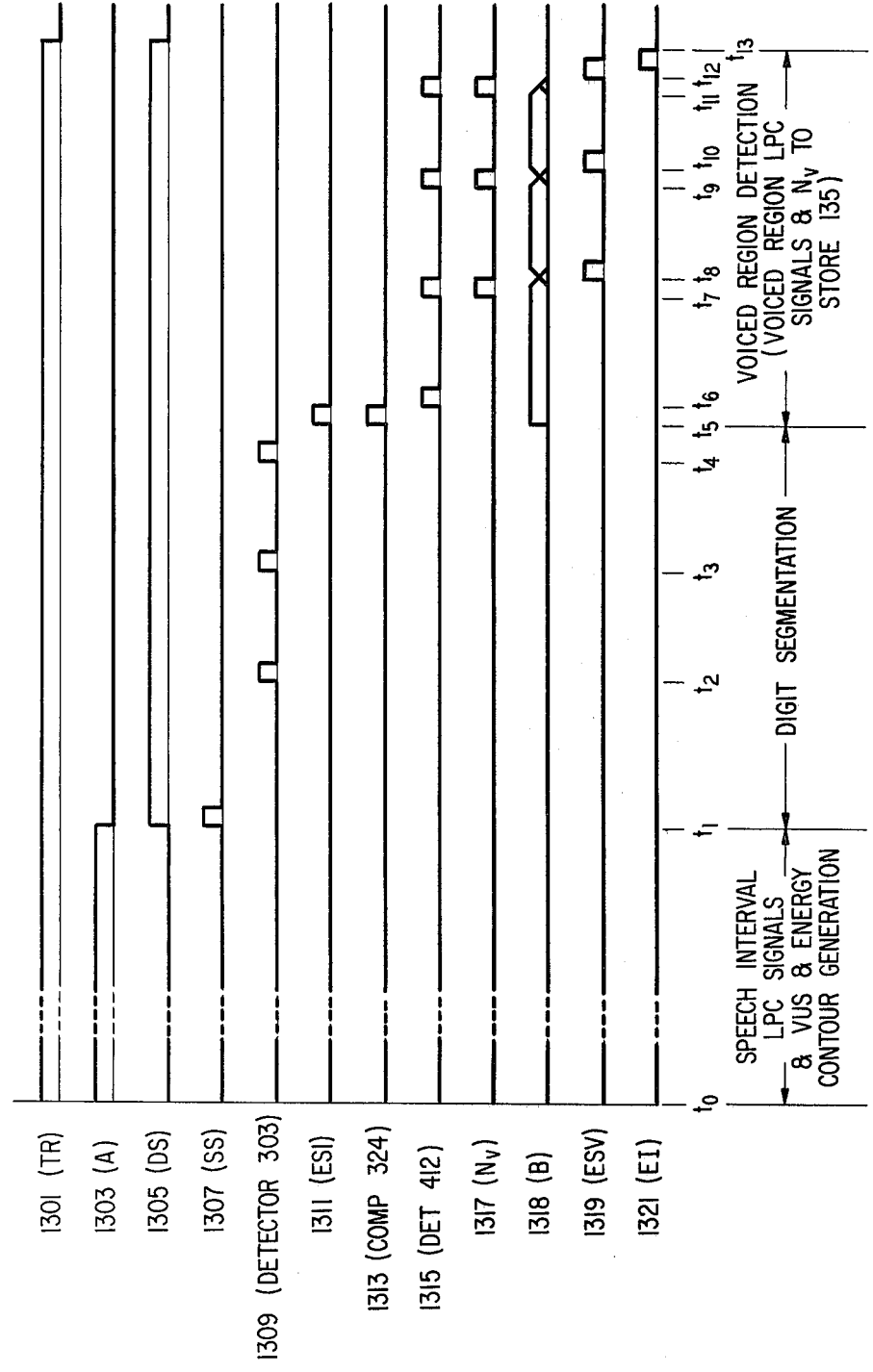

At the end of the speech interval, gate 113 is disabled by the change in signal A (waveform 1303) at time $t_1$ in FIG. 13 in speech interval detector 111 and an enabling signal DS (waveform 1305) is supplied to gates 122A, 126, and 132 from detector 111 at this time. Gate 122A connects the output of VUS contour store 117 to digit segmenter 128 while gate 126 connects the output of energy contour store 120 to the digit segmenter.

Segmenter 128 shown in FIG. 3 is operative to segment the speech signal into its component digit intervals. Digit segmentation is accomplished by providing a frame number corresponding to the start of the speech signal and the frame numbers corresponding to the ends of the digit voiced regions. Where a digit does not contain unvoiced or silence regions, the digit end point is obtained from the energy contour signal (waveform 1203), which contour signal includes minima at the all-voiced digit end points.

Referring to FIG. 3, pulse signal SS (waveform 1307 of FIG. 13) supplied from speech interval detector 111 is applied through delay 302 to OR gate 305 and is also applied to frame scanner 301. Scanner 301 is operative to scan VUS contour store 117 (shown in FIG. 3) which supplies the successive frame classification signals corresponding to waveform 1201 to end-of-voiced region detector 303. During the scan, frame counter 307, responsive to frame clock signals PF, maintains a record of the frame being scanned. The output of frame counter 307 is applied to gate 309 along with the output of OR gate 305. Thus, at the beginning of the scan responsive to start scan signal SS, gate 309 is enabled and digit boundary store 312 is addressed so that the frame corresponding to the beginning of the speech signal is identified therein. A voiced region end frame in the speech signal is detected in end-of-voiced region detector 303 which is operative to provide an output signal (waveform 1309) responsive to the transition from a voiced frame to either an unvoiced frame or a silence frame (e.g., time $t_A$ of waveform 1201). Upon the occurrence of this voiced-to-unvoiced or voiced-to-silence transition signal (waveform 1309), gate 309 is enabled and the transition frame defined by counter 307 is identified in digit boundary store 312. As illustrated in FIG. 13, gate 303 (waveform 1309) provides pulses corresponding to transition frames at times $t_2$, $t_3$ and $t_4$.

The output of detector 303 is also applied to the input of digit boundary counter 322, which is reset to zero at the beginning of the scan of VUS contour store 117. At the end of the VUS contour store scan, signal ES1 (waveform 1311 of FIG. 13) is generated by frame scanner 301 so that the count of counter 322 is supplied to one input of comparator 324 via gate 322a. The other input to comparator 324 is a coded signal representative of the number of digits plus one, $n+1$, in the digit string of the speech signal. If all the digits in the digit string have been segmented, the output of counter 322 is equal to $n+1$, and a enabling signal (waveform 1313 of FIG. 13) is applied from comparator 324 to line 327. As illustrated in FIG. 13, waveform 1313 signaling the end of the digit segmentation occurs at time $t_5$. If, however, the count of counter 322 is greater than $n+1$, the digit segmentation is in error. In that event, an enabling signal ER is applied from line 325 to control 180 to indicate the speech signal must be repeated.

Where one or more of digits in the speech signal does not contain the transition from a voiced region to an unvoiced or silence region (not shown in FIG. 13), the output of counter 322 is less than $n+1$. In that event, a signal is supplied from comparator 324 to frame scanner 317. Frame scanner 317 is then operative to scan energy contourstore 120 shown in FIG. 3. The output of energy contour store store 120 is applied to minimum detector 319 which may comprise the circuit of FIG. 10 and provides an output signal when the minimum point in the energy contour is reached (e.g., time $t_B$ of waveform 1203). The frame number of the minimum point is supplied from detector 319 to separation logic 320.

Logic 320 provides an output signal to OR gate 305 and digit boundary counter 322 if the minimum point frame is located outside a predetermined time interval from the last minimum point frame detected. The minimum point frame supplied by logic 320 is identified in digit boundary store 312, and digit boundary counter 322 is incremented. At the end of the energy contour store scan, signal ES2 is generated by frame scanner 317 so that the number of digit boundary points stored in counter 322 may be compared to the number of digits in the string. Where the number of boundary points is equal to $n+1$, an enabling signal is applied to digit voiced region detector 130 in FIG. 1A from comparator 324 via line 327 as aforementioned. If the number of boundary points is less than $n+1$, the energy contour scan is repeated to locate the second minimum point frame which is inserted into store 312. The scans of the energy contour store are repeated until the number of boundary points is equal to $n+1$. In accordance with the invention, the speech signal comprising a predetermined number of digits is segmented into its component digit intervals so that the linear prediction characteristics of selected regions of each digit may be stored in digit LPC store 135.

Digit boundary store 312 may comprise a shift register in which digit boundary frames are identified by a special boundary code, while other frames are identified as digit interior frames. Digit voiced region detector 130 in FIG. 1A detects the voiced region of each digit to control the insertion of the digit voiced region LPC signals into identified digit LPC signal store 135. Detector 130, shown in FIG. 4, is also operative to detect the number of frames (N$v$) in each segmented digit voiced interval. After the digits of the speech signal have been segmented and the segment boundaries identified in digit boundary store 312, the identified digit code of the first digit of the speech signal is supplied as coded signal B (waveform 1318) to store 135 from digit identifier 109. Responsive to signal ESV (waveform 1319) applied to digit identifier 109 from generator 422, the digit code B is altered for each successive segmented digit. Coded signal B addresses a preassigned section of store 135 so that the LPC signals from the identified segmented digit of the speech signal may be transferred from store 124 into the section of store 135 dedicated to the identified digit.

The output of VUS contour store 117 is applied to voiced region detector 420 in detector 130 and an enabling signal from detector 420 is supplied to gate 132 during the voiced region of the identified digit in the training mode. At this time, the output of speech interval LPC store 124 is also supplied to gate 132. The LPC signals corresponding to the identified digit voiced region are passed through gate 132 into store 135 as addressed by coded signal B (waveform 1318) from digit identifier 109 during the voiced region of the identified digit in the training mode. In this manner, the sets of 12 LPC signals of the voiced region frames of the identified region are stored for later use in the formation of reference sets of LPC coefficient signals during the reference mode.

While the voiced region LPC signals are transferred from store 124 to store 135, the output of digit boundary store 312 on line 316 is applied to boundary frame detector 412, which detector is operative to provide an output signal (waveform 1315) responsive to a boundary frame code from store 312. In the interval between detected boundary frames, frame counter 414 is operative to count the number of frames (N$v$) of the digit interval voiced region responsive to the output of detector 420. When a boundary frame is detected for the identified digit, gate 416 is enabled so that a signal N$v$ (waveform 1317) corresponding to the number of frames in the digit voiced interval is transferred from frame counter 414 via gates 416 and 418 to store 135 and the duration of the voiced interval of the identified digit is recorded. Counter 414 is then reset by the output of detector 412. Signal N$v$ is transferred from the output of gate 416 via gate 418, which gate is enabled only during the training mode, responsive to signal TR (waveform 1301). In this way, only the signals N$v$ for identified digits of the training sets are placed in store 135. When both the LPC signals of the voiced region of the identified digit and the signal N$v$ corresponding to the number of frames (duration) of said voiced interval are stored in store 135, pulse generator 422 provides signal ESV (waveform 1319 of FIG. 13) which signal is applied to digit identifier 109 and caused the output of digit identifier 109 to change signal B (waveform 1318) to the next identified digit of the speech signal.

As described with respect to the preceding identified digit, digit voiced region detector 130 is operative to transfer the LPC signals of the voiced region of the new identified digit into a prescribed section of store 135 addressed by the new coded signal B. The N$v$ signal for the new digit is also transferred into the identified digit section of store 135. At the end of the last digit of the speech signal, signal EI (waveform 1321 of FIG. 13) is generated in store 135, which signal is applied to speech interval detector 111 to terminate signal DS (waveform 1305) and permit the system of FIG. 1 to operate on a new speech signal and is also applied to control 180 to terminate the training mode by changing the state of signal TR as shown in waveform 1301.

FIG. 13 illustrates the aforementioned training mode operation where the speech signal from source 101 consists of three successive digits and each digit includes either unvoiced or silence periods. As indicated in FIG. 13, the LPC signals and VUS and energy contours are generated in the speech interval responsive to signal A (waveform 1303) between times $t_0$ and $t_1$. Digit segmentation is initiated by signal SS at time $t_1$. Voiced region end points are detected in detector 303 (waveform 1309) at times $t_2$, $t_3$ and $t_4$ so that four boundary frames are stored in shift register digit boundary store 312. At the end of the VUS scan ($t_5$), signal ES1 (waveform 1311) from scanner 301 opens gate 322 so that comparator 324 is operative. Counter 322 has reached the count of 4, and an output is obtained on line 327 from comparator 324 (waveform 1313 at $t_5$). At time $t_5$, voiced region detection is started. Between times $t_5$ and $t_7$, coded signal B (waveform 1318) addresses the first digit of the training digit sequence so that the LPC signals from store 124 are transferred into the digit section of store 135 addressed by signal B. At time $t_7$, boundary frame detector 412 provides an output signal (waveform 1315) and the N$v$ coded signal (waveform 1317) is transferred to store 135. Signal B is changed to address the second digit responsive to signal ESV (waveform 1319) at time $t_8$. In similar manner the LPC signals of the second digit are transferred to store 135 between times $t_8$ and $t_9$. The N$v$ signal for the second digit is transferred at time $t_9$. Similarly, the LPC signals of the third digit are transferred between times $t_{10}$ and $t_{11}$ and the N$v$ signal for the third digit is transferred at $t_{11}$. Signal EI (waveform 1321) from stre 135 terminates the training mode at time $t_{13}$.

After a predetermined number of speech signals, each of which consists of a specified digit string, sufficient data is stored in store 135 so that reference sets for each possible digit to be identified can be formed. /At this time, a mode signal correponding to the reference mode may be applied to mode detector 178, which, in turn, causes control logic 180 to be placed in its reference mode.

In the reference mode, reference set of signals is formed for each identified digit stored in store 135 by time aligning each identified digit training set LPC signals to the average voiced region duration for the identified digit training strings. A vector signal representative of the mean values of the time-aligned LPC signals of each frame is generated and a convariance matrix relating the time-aligned LPC signals of said frame is formed. The set of means and variances for each identified digit is stored for use in the recognition of the digits of an unknown digit string during subsequent recognition modes. As is well known in the art, the digit interval of a particular digit is highly variable and is dependent upon the characteristics of the speaker uttering the training set digit string and the position of the digit in the training set. To provide a reference set for each identified digit in accordance with the invention, a signal corresponding to the average number of frames in the digit voiced region is generated in accordance with $$\overline{Nv} = \frac{1}{J} \sum_{j=1}^{J} Nv_j, j = 1, 2, \ldots J \quad (12)$$

where $Nv$ is the number of frames in the voiced region of the jth repetition of the identified digit.

Figure 5:
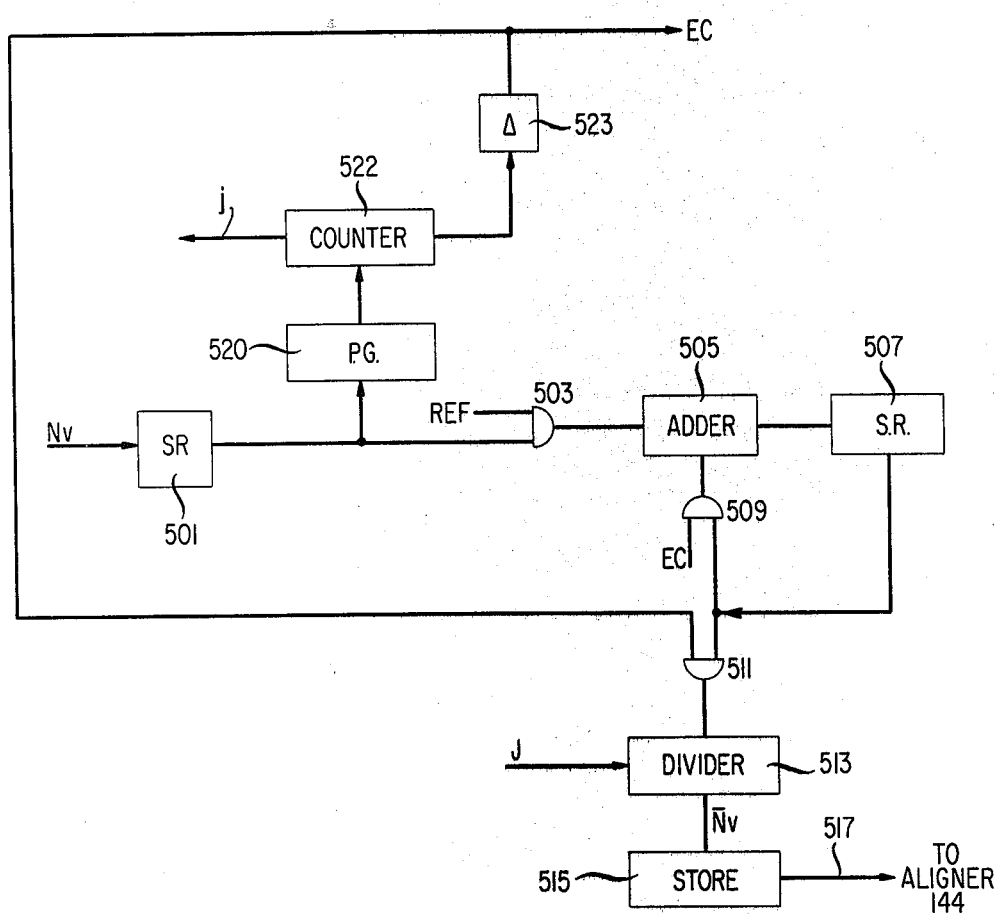
FIG. 5 shows a detailed block diagram of the voiced region averager circuit of the digit recognition system of FIG. 1A.

The average $\overline{Nv}$ is formed in voiced region averager 142 shown in FIG. 5. At the start of the reference mode, digit sequencer 182 in FIG. 1B is reset by control signal REF (waveform 1401 of FIG. 14) from control 180 to address the first identified digit. Responsive to signal REF, gate 183 is enabled so that coded signal ID1 (represented in waveform 1403 of FIG. 14) representative of the first identified digit is applied to address store 135. Signal ID1 causes the $Nv$ (waveform 1407) signals of the first identified digit to be applied from store 135 to gate 141 and line 140. Gate 141 is enabled by signal REF, whereby the $Nv$ signals (waveform 1407) are applied to shift register 501 (FIG. 5) in voiced region averager 142. Shift register 501 temporarily stores the sequence of J received $Nv$ signals. The $Nv$ signals are successively applied from shift register 501 to adder 505 via gate 503. Prior to the interval in which the first $Nv$ signal appears at one input of gate 503, shift register 507 is reset to zero. In this manner, the first $Nv$ signal is shifted directly into shift regiser 507. The succeeding $Nv$ signals applied to adder 505 are added to the partial sum temporarily stored in shift register 507.

Responsive to each $Nv$ code applied to gate 503, pulse generator 520 produces a pulse which is supplied to counter 522. Counter 522 is operative to count the number of $Nv$ signals. When the predetermined count J is recorded in counter 522, an output signal therefrom is applied through delay 523 to gate 511. Gate 511 is then enabled so that the sum of the $Nv$ signals is supplied from shift register 507 to divider 513 wherein the sum is divided by the predetermined count J stored in counter 522. At this time, gate 509 is disabled by signal EC from delay 523 whereby the total sum stored in shift register 507 is erased. The output of divider 513, which is a code representative of the number of frames $\overline{Nv}$ (waveform 1405) in the average voiced region for the identified digit, is transferred from the output of divider 513 to store 515.

Figure 6:
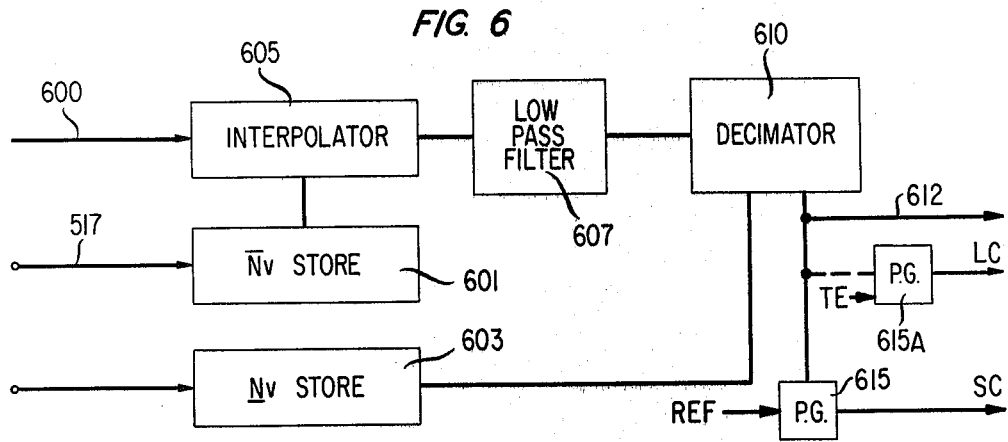
FIG. 6 shows an LPC alignment circuit useful in the recognition system of FIGS. 1A and 1B.

LPC signal aligner circuit 144 in FIG. 1A is operative to time align the J repetitions of the same digit so that the same speech event occurs at the same time for all repetitions of the identified digit. Once the speech events are time aligned, the reference characteristics for the identified digits may be derived from the training sets stored in store 135. FIG. 6 shows an interpolator-low-pass filter-decimator arrangement well known in the art which may function as LPC signal aligner circuit 144.

Referring to FIG. 6, the $\overline{Nv}$ signal (waveform 1405) from store 515 of voiced region averager 142 is inserted into $\overline{Nv}$ store 601 via line 517 and the $Nv$ signal (waveform 1407) corresponding to the first training set identified digit voiced region duration is applied to $Nv$ store 603 from identified digit store 135 via gate 143. the output of store 601 is applied to interpolator 605, and the output of store 603 is applied to decimator 610. The LPC signals $a(n)_i$ of the identified digit are sequentially applied from store 135 to interpolator 605 via gate 141a and line 600.

The first set of LPC signals consists of the frame sequence of the first linear prediction coefficient signals of the identified voiced region, i.e., $a(1)_1, a(1)_2 \ldots a(1)_{Nv}$ where the subscripts refer to the voiced interval frame number. Interpolator 605 is operative to increase the number of frame samples of the LPC signals to $(\overline{Nv}) \cdot (Nv)$. As is well known in the art, this is done by inverting zero-valued samples between each successive frame LPC signals of the set.

The output of interpolator 605 is applied to low-pass filter 607, which produces a piecewise linear signal corresponding to the output sequence of interpolator 605. As is well known in the art, the piecewise linear signal consists of line segments connecting the values of the $a(1)_i$ samples from interpolator 605. This piecewise linear sequence is applied to decimator 610, which is operative to reduce the number of frame samples by the factor $Nv$. The resultant output of decimator 610 consists of $\overline{Nv}$ samples, $a'(1)_1, a'(1)_2, \ldots, a'(1)_{\overline{Nv}}$, corresponding to the $nv$ first linear prediction coefficient signals $a(1)_1, a(1)_2, \ldots, a(1)_{\overline{Nv}}$ applied to interpolator 605. In this manner, the number of frames of the voiced region first linear prediction coefficient signals is changed from $Nv$ to $\overline{Nv}$ so that the LPC signals are aligned to the average voiced region frames.

For example, assume a training mode spoken digit in an identified speech sequence has a voiced interval ($nv$) of 50 frames and the average voiced interval ($\overline{Nv}$) for the J samples of the spoken digit is 40 frames. Interpolator 605 is operative to insert zero valued samples in the input sample sequence $a(1)_1, a(1)_2, \ldots, a(1)_{50}$ so that the total number of frame samples is increased to $(50) \cdot (40)$. Low pass filter 607 provides a piecewise linear signal which is representative of the first linear prediction coefficient over the frames of the voiced interval of the digit. Decimator 610 reduces the number of samples by a factor of 50 whereby 40 equally spaced samples of the piecewise linear signal are obtained. In this manner, each training mode spoken digit voiced interval linear prediction coefficients are normalized or aligned to the average voiced interval ($\overline{Nv}$) for the identified spoken digit. Thus, regardless of the number of frames ($Nv$) of each individual spoken digit sample, aligner 144 provides a sequence of $\overline{Nv}$ (e.g., 40) samples for each linear prediction coefficient representative of the coefficient over the voiced interval thereof.

The sequential frame second linear prediction coefficient signals $a(2)_1, a(2)_2, \ldots, (2)_{Nv}$ are then applied to interpolator 605 so that the number of frame samples of the second linear prediction coefficient signals is also changed to $(\overline{Nv})\cdot(Nv)$. After low-pass filtering and decimation time-aligned samples $a'(2)_1, a'(2)_2 \ldots a'(2)_{\overline{Nv}}$ are obtained from decimator 610. In similar manner, the remainder of the linear prediction coefficient signals are aligned to the average number of frames $\overline{Nv}$ of the identified digit voiced interval. The time aligned output of each training set identified digit is $$a'(1)_1, \ldots, a'(1)_{\overline{Nv}}, a'(2)_1, \ldots, a'(2)_{\overline{Nv}}, \ldots, a'(12)_1, \ldots, a'(12)_{\overline{Nv}} \quad (13)$$

The operation of aligner 144 is repeated for each $J^{th}$ repetition of the digit specified by code ID1.

The circuit of FIG. 6 may comprise any of the well-known interpolator, low-pass filter and decimator circuits as arranged in FIG. 6. Preferably, the interpolation-decimation circuit disclosed in U.S. Pat. application Ser. No. 616,283, filed Sept. 24, 1975, now U.S. Pat. No. 3,745,136, of R. E. Crochiere and L. R. Rabiner may be used.

The sequence of time-aligned linear prediction coefficient signals of Equation (13) is applied to LPC mean and covariance matrix processor 146 for each repetition of the identified digit. Responsive to the voiced region LPC signals of Equation (13) for the J repetitions of the identified digit, ID1, a set of reference characteristic signals is formed in processor 146. For each frame $i=1, 2, \ldots, \overline{Nv}$ a coded signal for the mean value of each coefficient signal is formed. For example, the mean $m(n)_{iq}$ corresponding to the average of the time aligned $n$ linear prediction signals over J repetitions of the $i^{th}$ frame $$m(n)_{iq} = \frac{1}{J} \sum_{j=1}^{J} a'(n)_{iq} \quad (14)$$

where $n=1, 2, \ldots, 12$ is the LPC coefficient signal number, $i=1, 2, \ldots, \overline{Nv}$ is the frame number, and $q=1, 2, \ldots, Q$ is the identified digit (ID1) is produced. Responsive to the $m(n)_{iq}$ signals of each frame of the voiced region of the $q^{th}$ identified digit, a reference set signal $$m_{iq} = (m)(1)_{iq}, m(2)_{iq} \ldots, m(12)_{iq}) \quad (15)$$

representative of the mean values of the aligned training set LPC signals is generated.

In addition, the covariance matrix $S_{iq}$ with elements $$S(u,v)_{iq} = \frac{1}{J} \sum_{j=1}^{J} a'(u)_{ij} a'(v)_{ij} - m(u)_{iq} m(v)_{iq} \quad (16)$$

is generated for each frame $i=1, 2, \ldots, \overline{Nv}$ where $u=1, 2, \ldots, 12$ and $v=1, 2, \ldots, 112$. The covariance matrix $S_{iq}$ is produced from the mean values $m(n)_{iq}$ of Equation (15) amd the coefficient signals $a'(n)_i$ of each frame.

The set of reference characteristic signals for the $q^{th}$ identified digit consists of the mean signals $m_{iq}$ and the covariance matrix signals $S_{iq}$ for each frame. These reference characteristic signals are transferred from processor 146 to reference characteristic store 148 via lines 147a and 147b and are stored in reference store 148 as addressed by the $q^{th}$ identified digit code ID1. The $\overline{Nv}$ signal (waveform 1405) from voiced region averager 142 is also inserted into store 148. When the reference characteristic signals of digit $q$ are stored, control signal EDO (waveform 1409) is generated in store 148, which EDO signal increments digit sequencer 182 so that the reference characteristic signals for the next identified digit may be formed as described with respect to identified digit $q$. Responsive to the storage of the last-identified digit, Q a control signal ERR (waveform 1411) is applied to control 180 from digit sequencer 182 so that the reference mode is terminated by disabling signal REF (waveform 1401) in control 180.

Mean and covariance matrix processor 146 may comprise arithmetic and memory units well known in the art. Preferably, processor 146 may comprise one of the aforementioned microprocessors having a permanent stored program control ROM constructed in accordance with the Fortran program listing of Appendix 2. The aligned LPC signals from alignment circuit 144 are applied to interface adapter 1101 of processor 146 via line 1140; and start control signal SC to initiate the operation of the microprocessor is supplied from pulse generator 615 and aligner 144 to interface adapter 1101 via line 1142. The microprocessor of FIG. 11 produces mean value signals $m(n)_{iq}$ and covariance matrix signals $S_{iq}$ on a frame-by-frame basis, which signals are applied to reference characteristic store 148 via lines 1150 and 1152 from interface adapter 1101. The $m(n)_{iq}$ and $S_{iq}$ signals are inserted in store 148 as addressed by coded signal ID1 (waveform 1402) from gate 183.

Figure 14:
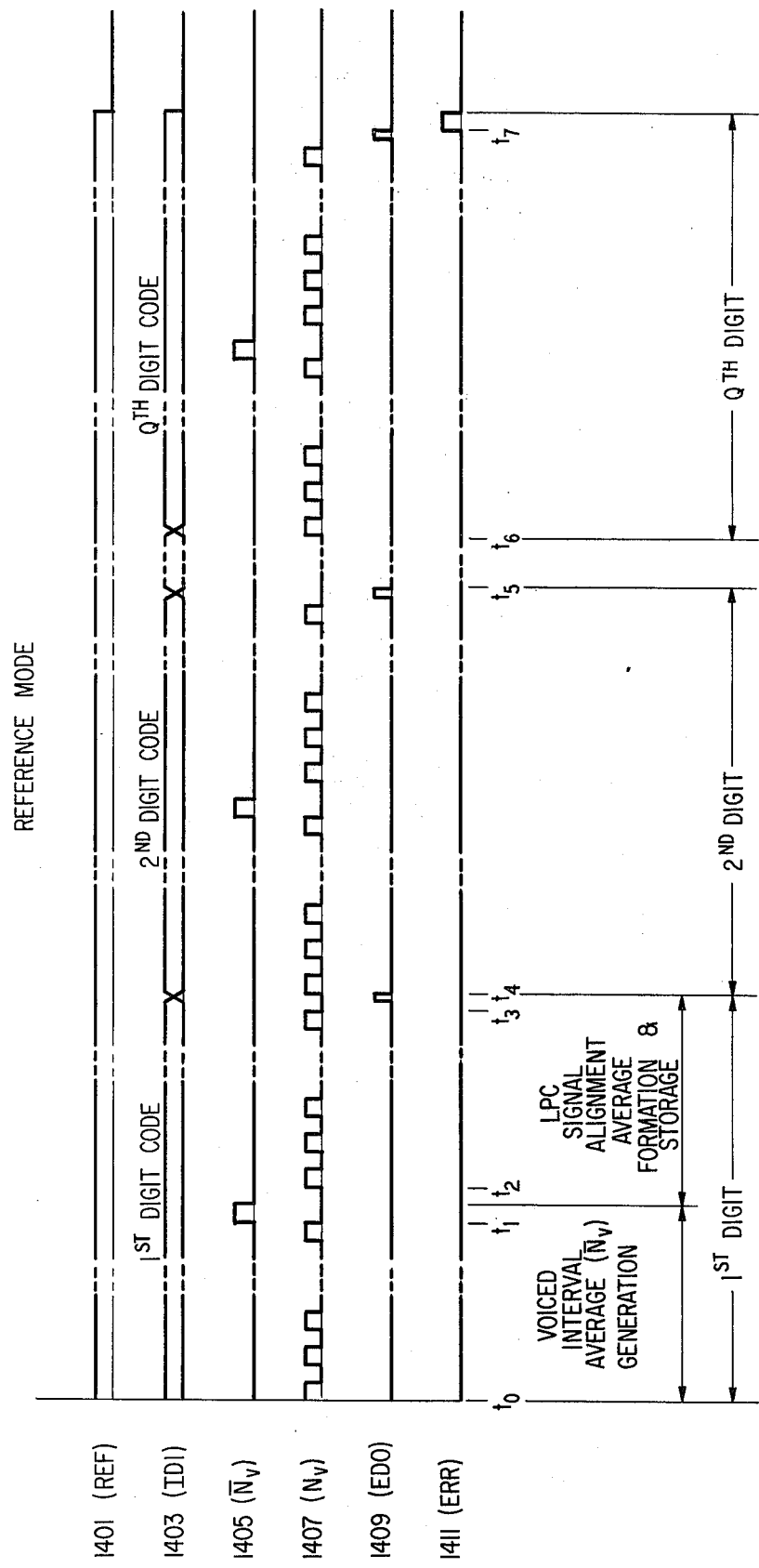

FIG. 14 illustrates the aforementioned reference mode operation where there are Q identified digits. As indicated in FIG. 14, the first identified digit code (ID1 waveform 1403) is obtained from gate 183 at time $t_0$ responsive to signal REF (waveform 1401). Between times $t_0$ and $t_1$ the successive Nv training set coded signals from store 135 (waveform 1407) are applied to voiced region averager 142 and coded signals $\overline{Nv}$ (waveform 1405) representative of the number of frames in the average voiced interval is generated at $t_1$. The $\overline{Nv}$ and the successive Nv coded signals of the training sets are applied to LPC aligner 144 between $t_2$ and $t_3$ so that the aligned LPC signal sets are formed and applied therefrom to processor 146 wherein the mean and covariance signals are formed and transferred to store 148 as addressed by the coded ID1 signal for the first digit. At time $t_4$, the reference signals $m_{iq}$ and $S_{iq}$ are stored in store 148 and signal EDO (waveform 1409) is generated in store 148. Signal EDO increments digit sequencer 182 at time $t_4$ whereby the ID1 output of gate 183 is changed to the second digit code. Between times $t_4$ and $t_5$, the $\overline{Nv}$ coded signal for the second digit is generated; the aligned LPC signals are formed; and the $m_{iq}$ and $S_{iq}$ signals are generated for the second digit. In similar manner, the $m_{iq}$ and $S_{iq}$ signals are formed and stored for the Qth digit is indicated between times $t_6$ and $t_7$. At time $t_7$, signal ERR is generated in sequencer 182 so that control signal REF is disabled by control 180.

After the reference characteristic signals for all possible digits 1, 2, ..., Q have been stored in reference set store 148, the reference mode is terminated by disabling signal REF and the recognition mode can be initiated responsive to the recognition mode signal applied to line 177. Mode selector 178 causes control logic 180 to be placed in its recognition mode in which control signal TE is first generated. Signal TE is shown in waveform 1501 of FIG. 15 which also shows other waveforms illustrating the operation of the system of FIGS. 1A and 1B in the recognition mode. A speech signal consisting of a string of $n$ unidentified digits is applied to A-to-D converter 105 wherein the spoken digit string signal is low-pass filtered and sampled to form coded sample signals $s_n$ at a 10 kHz rate. As described with respect to the training mode, LPC generator 122 is again operative in the recognition mode to form the LPC signals of each frame of the speech interval determined by speech interval detector 111. The unidentified digit string LPC signals from generator 122 are stored in speech interval LPC store 124.

The speech interval frame LPC signals are applied in frame sequence to autocorrelation matrix processor 137 during the recognition mode. Processor 137 is reponsive to the LPC signals of each successive frame to produce a set of frame autocorrelation matrix coefficients $$r(n)_i = \sum_{k=1}^{P} a(k)_i r(|n-k|)_i \qquad (17)$$

$$r(O)_i = \sum_{k=1}^{P} a(k)_i r(k)_i + 1 \qquad (18)$$

in accordance with the aforementioned article by Atal and Hanauer in the *Journal of the Acoustical Society of America*, Vol. 50, No. 2, part 2, 1971, at pages 637-655. Matrix generator 137 may comprise one of the aforementioned microprocessors well known in the art as shown in FIG. 11, having a stored program control ROM permanently adapted to perform the Fortran language program listing of Appendix 3.

When the microprocessor of FIG. 11 is used as autocorrelation generator 137, interface adapter 1101 receives the LPC signals from store 124 via line 1140 and receives a control signal ACS from store 124 after the storage of LPC signals is completed to start operation via line 1142. The output autocorrelation coefficient signals from the microprocessor of FIG. 11 are applied to store 139 from interface adapter 1101 via line 1150. The output autocorrelation coefficient signals for each frame are stored in speech interval autocorrelation matrix store 139 for use in distance processors 156 and 170, which are operative later in the recognition mode.

Responsive to signal A (waveform 1503 between times $t_0$ and $t_1$) from speech interval detector 111 and the sampled speech signals $s_n$, VUS processor 115 produces a voiced, unvoiced, or silence classification signal and an energy signal for each frame of 200 sample signals $s_1$, ..., $s_{200}$ in the same manner as in the training mode. The sequence of classification signals is stored in VUS contour store 117 and the sequence of frame energy signals is stored in energy contour store 120. At the end of the speech signal interval, control signal A reverts to its non-enabling state so that VUS processor 115 and LPC signal generator 122 are turned off. At this time (e.g., $t_1$), signal DS (waveform 1505) from speech interval detector 111 enables gates 122A and 126. Responsive to signal DS, VUS store 117 and energy store 120 are connected to digit segmenter 128. As described with respect to the training mode, the boundary frames are detected and stored in store 312. Digit voiced region detector 130 is then enabled. The $Nv$ signal from detector 130 is applied to test $N_v$ store 133, wherein it is stored for use in LPC time aligner 152. The output of voiced region detector 130 from gate 430 (VR2 shown in waveform 1507) of FIG. 4 defines the voiced region of each digit of the segmented digit string.

In accordance with the invention, an unknown digit from a string of connected digits is recognized by determining which identified digit reference characteristic set in store 148 has the closet correspondence to the LPC characteristics of the unknown digit voiced region stored in store 124. The correspondence between the linear prediction characteristics of the unknown digit and the stored reference characteristics is evaluated on a frame-by-frame basis after the unknown digit voiced interval LPC signals are aligned to the average voiced interval $\bar{N}v$ of the reference set.

The correspondence of the reference characteristics and the aligned test characteristics is determined by forming a distance signal $$d_{1iq} = (\hat{a}_i - m_{iq})\lambda_i^{-1}(\hat{a}_i - m_{iq})^t \qquad (19)$$

for each frame of the aligned test digit voiced region in processor 156, where $$\lambda_i = R_i^{-1}(\hat{a}_i R \hat{a}_i^t) \qquad (20)$$

and $R_i$ is the autocorrelation matrix of the frame formed from the autocorrelation coefficients $r_i$ in stoe 139. $\hat{a}_i$ is the vector consisting of the LPC signals of the $i^{th}$ frame of the test digit voiced region (aligned) to the average voiced region $\bar{N}v$ of the reference set.

$$\hat{a}_i = (a'(1)_i, a'(2)_i, \ldots, a'(12)_i) \qquad (21)$$

$m_{iq}$ is the vector consisting of the mean value signals of the $i^{th}$ frame of the $q^{th}$ digit reference set average voiced region $\bar{N}v$ in stored 148.

$$m_{iq} = (m(1)_{iq}, m(2)_{iq}, \ldots, m(12)_{iq}) \qquad (22)$$

After the $d_{1iq}$ signals are formed for the $\bar{N}v$ frames of the reference $q^{th}$ digit voiced interval, the average value $D_{iq}$ is generated in accordance with $$D_{1q} = \frac{1}{\bar{N}v} \sum_{i=1}^{\bar{N}v} d_{1iq} \qquad (23)$$

A $D_{1q}$ signal derived for each identified digit is representative of the correspondence between the unknown digit characteristics and the $q^{th}$ identified digit reference characteristics. The minimum $D_{iq}$ signal corresponds to the identity of the unknown test digit.

An alternative distance measure $$d_{2iq} = (\hat{a}_i - m_{iq})C_{iq} - 1(\hat{a}_i - m_{iq})^t \qquad (24)$$

where $$C_{iq} = (S_{iq} + \frac{R^{-1}(\hat{a}_i R_i \hat{a}_i^t)}{N})$$

where $N = 200$ may be derived from the unknown digit LPC signals and the stored reference characteristics of each identified digit in $D_{2q}$ processor 170 from which the average distance signal $$D_{2q} = \frac{1}{\bar{N}v} \sum_{i=1}^{\bar{N}v} d_{2iq} \qquad (25)$$

is generated. While the formation of $D_{2q}$ is much more complex, $D_{2q}$ is a more appropriate distance metric where the digit segmentation boundary occurs within a voiced region. This is so because of the anticipated high degree of coarticulation between digits. Where the digit segmentation boundary occurs at a voiced-to-unvoiced transition or an unvoiced-to-voiced transition, the simpler distance measure signal $D_{1q}$ can be used.

In the arrangement of FIGS. 1A and 1B, $D_{1q}$ is first formed for each identified digit. The minimum $D_{1q}$ and the next larger $D_{1Q}$ from the set $D_{10}, D_{12}, \ldots, D_{1q}$ are then stored. Where the ratio of the next larger $D_{1q}$ to the minimum $D_{1q}$ is less than a predetermined value, e.g., 1.1, the $D_{2q}$ signals are formed to provide a more accurate determination of the identity of the test digits. $D_{2q}$ is also used in the event that there is a conflict in the voiced-unvoiced-silence information of VUS store 117 and the identity of the unknown digit. Thus, the digit identified by the minimum $D_{1q}$ may be a 1, an 8, or a 9 which begin with voiced regions, and the beginning digit boundary frame may be an unvoiced or silence frame. There is a conflict between the VUS information and the digit identified by the minimum $D_{1q}$ signal. This conflict is resolved by the formation of the $D_{2q}$ distance signals. Similarly, if the digit begins with a voiced frame and the digit is a 0, 2, 3, 4, 5, 6, or 7 which begin with unvoiced frames, there is an inconsistency which is resolved by the use of the $D_{2q}$ distance signals.

In the recognition mode, signal TE1 (waveform 1509 of FIG. 15) is generated in control 180) responsive to the trailing edge of the signal VR2 (waveform 1507) upon termination of the digit voiced region detection for each unknown digit by detector 130. The number of frames (Nv) of the unknown digits are applied from gate 416 in detector 130 to test Nv store 133 via gate 130c. Signal TE1 is operative to reset digit sequencer 182 to the first identified digit, e.g., 0, whereby a code ID2 representing the first identified digit is available at the output of gate 184. The ID2 signal is applied to reference characteristic store 148 to address the first identified digit reference characteristics. At this time, the $\overline{N}v$ signal corresponding to the first identified digit is available from store 148 on line 149; the linear prediction characteristics of the unknown digit from LPC signal store 124 are available on line 123; and NRv coded signal (waveform 1511) corresponding to the number of frames in the voiced region of the unknown digit is also available from test Nv the output of store 133.

LPC signal aligner 152, which may be the circuit shown in FIG. 6, is now operative to align or normalize the LPC signals available on line 123 from store 124 to the average voiced interval $\overline{N}v$ of the reference identified digit. The $\overline{N}v$ signal from store 148 on line 149 is applied to aligner 152 via gate 150a. Signal VR2 is available from digit voiced region detector 130 via gate 430. The VR2 signal is enabling during the voiced interval of the unknown digit and is applied to gate 150b together with the speech interval LPC signal outputs on line 123. The unknown digit LPC signals are applied to aligner 152 from store 124 in the following order:

$$a(1)_1 \ldots a(1)_{NRv}, a(2)_1 \ldots a(2)_{NRv}, \ldots, a(12)_1 \ldots a(12)_{NRv} \quad (26)$$

Additionally, signal NRv (waveform 1511) representative of the number of frames in the digit voiced region is supplied from store 133 to aligner 152.

Aligner 152 may be in the interpolator-low-pass filter-decimator arrangement of FIG. 6 which is operative first to interpolate the unknown LPC signals $a(1)_1, a(1)_2, \ldots a(1)_{NRv}$ of Equation (26) by increasing the sampling rate by a factor $\overline{N}v$. A piecewise linear signal representative of the interpolated LPC signals is then formed in the low-pass filter. The low-pass filtered signal is then decimated by a factor NRv to produce a sequence of output LPC signals $$a'(1)_1, a'(1)_2, \ldots, a'(1)_{\overline{N}v} \quad (27)$$

which are aligned with the reference set of $m_{iq}$ and $S_{iq}$ signals stored in reference characteristic store 148. Similarly, the LPC signal sets $$a'(2)_1, a'(2)_2 \ldots a'(2)_{\overline{N}v}, \ldots, a'(12)_1, \ldots, a'(12)_{\overline{N}v} \quad (28)$$

are sequentially formed in aligner 152.

In this manner, the Nv LPC signals from aligner 152 can be directly compared to the $\overline{N}v$ mean value signals $m_{iq}$ in store 148. If the unknown spoken digit is the identified digit for which the $m_{iq}$ signals are stored in store 148, the time aligned LPC signals obtained over the voiced interval of the unknown digit closely match the $m_{iq}$ signals. For all other identified digits, however, the time aligned LPC signals obtained over the voiced interval of the unknown digit will differ greatly from the $m_{iq}$ signals in store 148 obtained from identified digits in the training mode.

Figure 8:
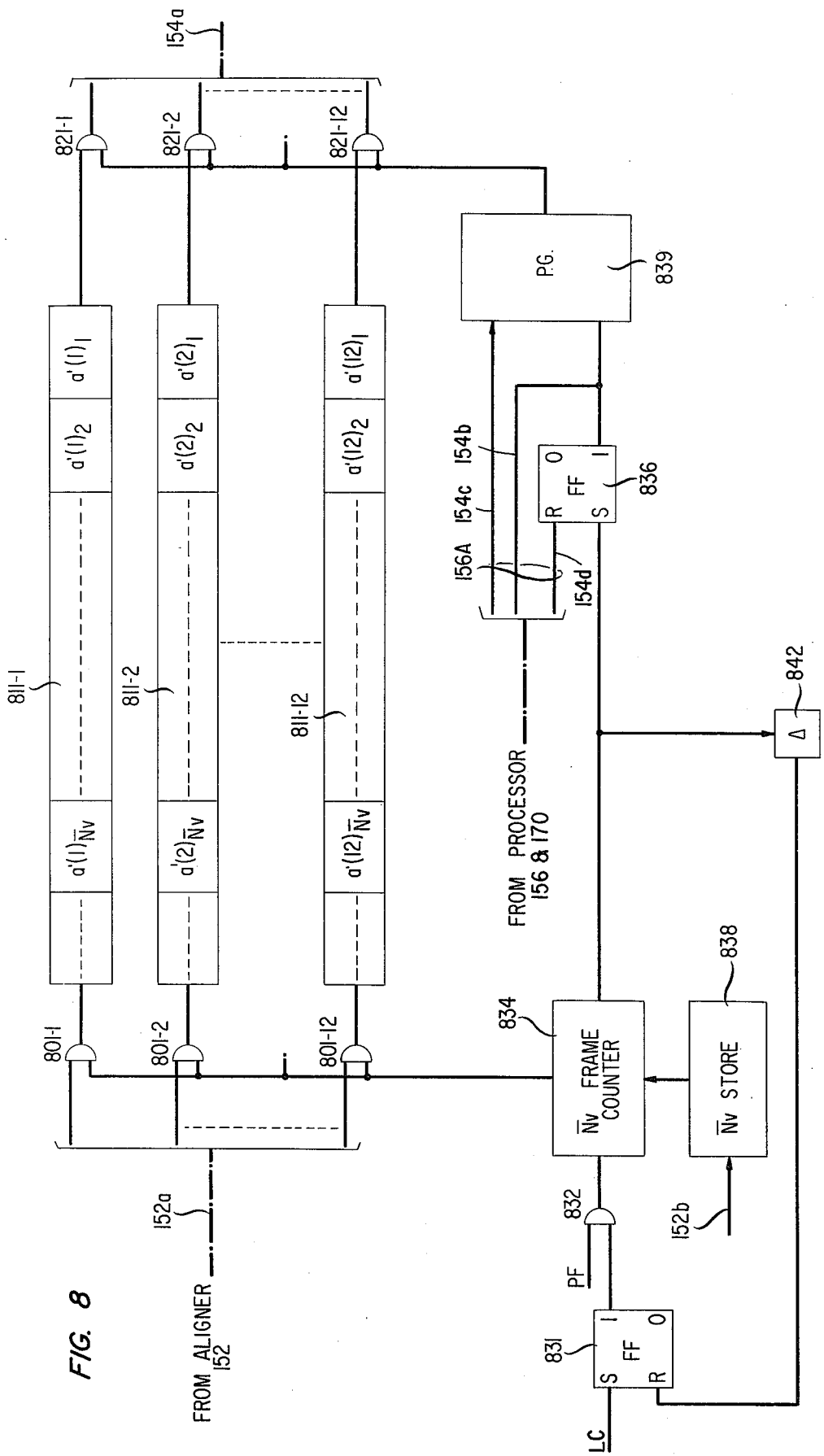
FIG. 8 shows a detailed block diagram of the aligned test LPC signal store of FIG. 1B.

The aligned output LPC signals from aligner 152 are applied to aligned test LPC signal store 154, which is shown in FIG. 8. Referring to FIG. 8, control signal LC (waveform 1513) from pulse generator 615A of aligner 152 sets flip-flop 831 when linear prediction coefficient signals are available from aligner 152. Prior to this time, the $\overline{N}v$ coded signal, representative of number of frames in the voiced interval, is supplied from gate 150a to store 838 via line 152b. The $\overline{N}v$ code is applied to $\overline{N}v$ frame counter 834 from store 838. Counter 834 is operative responsive to frame clock signals PF via gate 832 to count the frames of the average voiced region during which the time aligner 152 is operative. During the first $\overline{N}v$ frames, gate 801-1 is enabled by frame counter 834 so that the first linear prediction coefficient signals are inserted sequentially into shift register 811-1 from aligner 152 via line 152a. Aligned coefficient $a'(1)_1$ is inserted first, followed by coefficient $a'(1)_2$.

The $a'(1)_i$ coefficient signals are sequentially stored in shift register 811 until the $\overline{N}v$th frame during which coefficient signal $a'(1)_{\overline{N}v}$ is inserted. At this time, frame counter 834 causes gate 801-1 to be disabled and enables gate 801-2, so that the sequentially occurring second linear prediction coefficient signals $a'(2)_1, a'(2)_2, \ldots, a'(2)_{\overline{N}v}$ are placed in shift register 811-2. After coefficient signal $a'(2)_{\overline{N}v}$ is placed in shift register 811-2, frame counter 834 disables gate 801-2. In similar manner, the third coefficient signals through the eleventh coefficient signals are sequentially placed in corresponding registers (not shown in FIG. 8). After coefficient $a'(11)_{\overline{N}v}$ is inserted into the store of FIG. 8, a signal from frame counter 834 enables gate 801-12 so that the twelfth linear prediction coefficients $a'(12)_1, a'(12)_2, \ldots, a'(12)_{\overline{N}v}$ are inserted into shift register 811-12.

After coefficient $a'(12)_{\overline{N}v}$ is entered into register 811-12, an output from frame counter 834 sets flip-flop 836 to signal the completion of the loading of LPC store 154. Flip-flop 831 is then reset via delay 842. The one output of flip-flop 836 is enabled and this enabling signal (waveform 1515) is sent to $D_{1q}$ processor 156 via line 154b to initiate the generation of the $d_{1iq}$ signals and the $D_{1q}$ signal in accordance with Equations (19) and (23).

The one output flip-flop 836 is also supplied to pulse generator 839, which is operative responsive to signals from processor 156 applied via line 154c to concurrently enable gates 821-1 through 821-12 so that the linear prediction coefficient signals of each frame, $a'(1)_i$, $a'(2)_i$, ..., $a'(12)_i$, starting with the first frame of the digit voiced interval, are transmitted in parallel from shift registers 811-1 through 811-12 to processor 156 via line 154a and gate 155 as required by processor 156. After the last set of linear prediction coefficients are applied to processor 156, flip-flop 836 is reset by a signal from processor 156 on line 154d.

Processor 156 is responsive to the linear prediction coefficient signals obtained from store 154 via gate 155, the $m_{iq}$ signals retrieved from store 148 via line 151, the $r_i$ signals from store 139 via line 139a to form the $d_{1iq}$ signals of Equation (19) for each frame of the digit voiced interval and to average the $d_{1iq}$ signals in accordance with Equation (23). Processor 156 may comprise one of the aforementioned microprocessors shown in FIG. 11 in which stored program control ROM 1109 is permanently arranged in accordance with the Fortran language program listing of Appendix 4. The $m_{iq}$ signals from store 148 are applied to direct memory access 1105 via lines 151 and 1130. The autocorrelation coefficient signals from store 139 are applied via lines 139a and 1130 to direct memory access 1105, and the unknown digit LPC signals from store 154 are applied to interface adapter 1101 via gate 155 and line 1140. A control signal is applied from the one output of flip-flop 836 (waveform 1515) in store 154 via line 154b to interface adapter 1101 via line 1142 to initiate $d_{1iq}$ and $D_{1q}$ generation. The output of processor 156 for the $q^{th}$ identified digit is a coded $D_{1q}$ signal, which signal is applied from interface adapter 1101 via line 1150 to $D_{1q}$ minimum selector 160.

Figure 9:
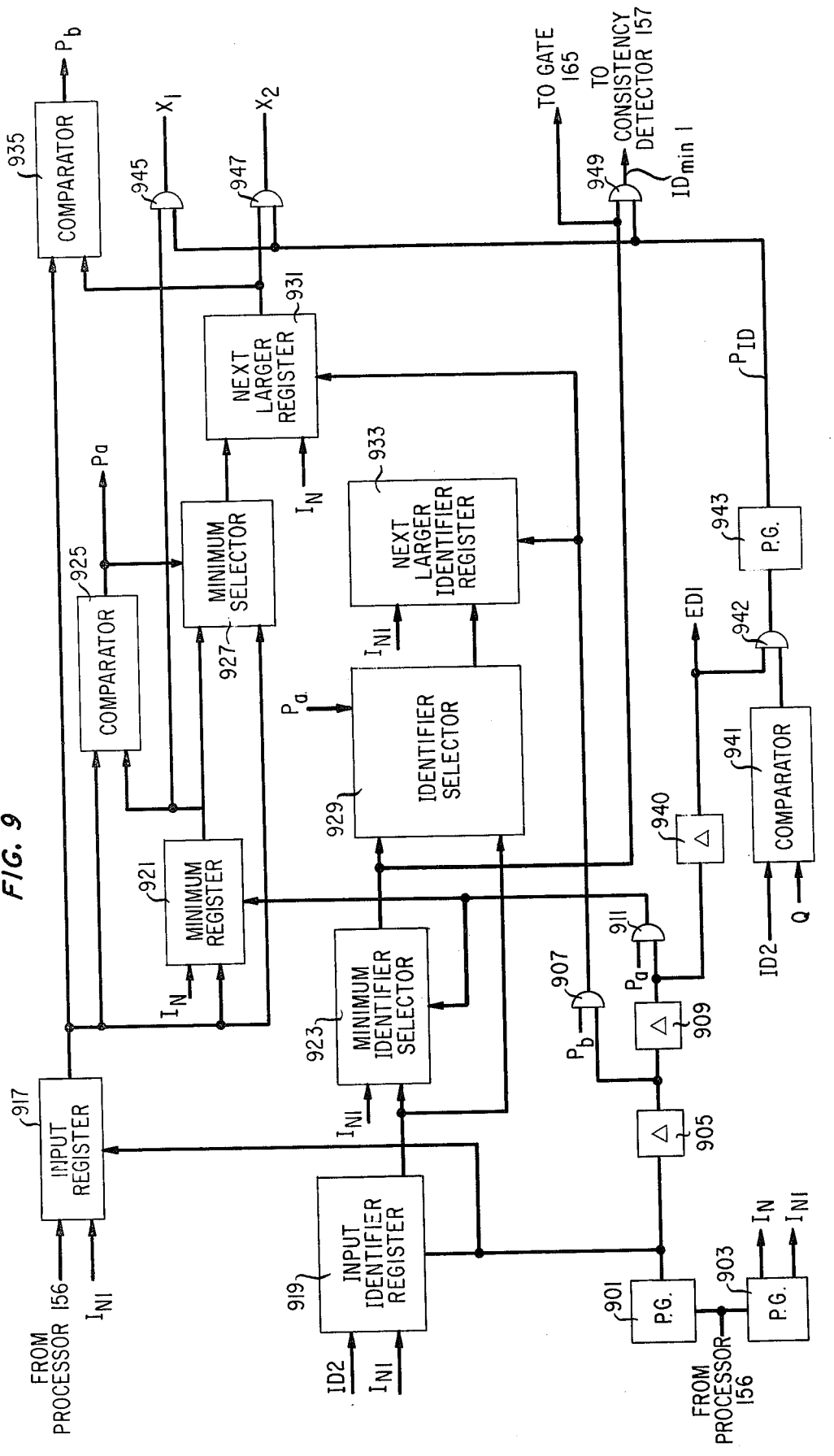
FIG. 9 shows a detailed block diagram of the $D_{1q}$ minimum selector circuit of FIG. 1B.

The $D_{1q}$ code for each identified digit is applied from processor 156 to $D_{1q}$ minimum selector 160 as it is generated in processor 156. Selector 160 shown in FIG. 9 is operative to select the minimum $D_{1q}$ code and the next larger $D_{1q}$ code. Prior to the formation of the $D_{1q}$ code in processor 156, an initialize signal is applied to pulse generator 903 from processor 156. Responsive to the operation of pulse generator 903, a coded signal $I_N$ is applied to minimum register 921 and next larger register 931 to insert therein the largest possible $D_{1q}$ value. Signal $I_{N1}$ from pulse generator 903 is applied to input register 917, input identifier register 919, minimum identifier register 923 and next larger identifier register 933 to set these registers to zero.

Upon formation of the $D_{1q}$ code for the first identified digit, pulse generator 901 is operative to gate the $D_{1q}$ signal from processor 156 into input register 917 and to gate the first identified digit identifier code ID2 into register 919. The content of register 917 is then compared to the content of minimum register 921 in comparator 925. Since register 921 was initialized to the highest possible value, comparator 925 produces an enabling signal corresponding to register 921 containing a code larger than the $D_{1q}$ code in register 917. This enabling signal $P_a$ causes the output of register 921 to be gated through selector circuit 927 to the input of next larger register 931. The output of input register 917 is also compared to the output of next larger register 931 in comparator 935. Responsive to the content of register 917 being less than the content of register 931, comparator 935 produces an enabling $P_b$ signal. The $P_b$ signal is applied to one input of gate 907.

After the two comparisons are made, a pulse is applied to the other input of gate 907 from pulse generator 901 via delay 905 provided that the contents of input register 917 is less than the content of next larger register 931. The output of selector 927 is then inserted into next larger register 931 and the corresponding identified code is inserted into register 933 via selector 929. In the case of the first identified digit, the content of register 921 is transferred via selector 927 and enters into next larger register 931. At the same time, the identifier code in register 923 is transferred via identifier selector 929 to the next larger identifier register 933.

After the transfer into register 931, gate 911 is opened responsive to the delayed pulse from delay 909 and an enabling $P_a$ signal. The $P_a$ signal is enabling only if the content of input register 917 is less than the content of minimum register 921. In the case of the first identifier digit this is true so that the content of register 917 is transferred into minimum register 921 and the corresponding identifier code is transferred from register 919 to register 923.

In general, register 921 stores the minimum $D_{1q}$ code obtained from processor 156 while register 931 stores the next larger $D_{1q}$ code. Comparator 925 is operative to compare the newly entered $D_{1q}$ code in register 917 to the minimum $D_{1q}$ code in register 921. The larger of the two codes is transferred to the input of next larger register 931 via selector 927. Comparator 935 is operative to provide a transfer into register 931 only if the input register code is less than the stored next larger $D_{1q}$ code in register 931. In this manner, if the $D_{1q}$ code in register 917 is larger than the minimum $D_{1q}$ code in register 921 but smaller than the next larger $D_{1q}$ code in register 931, it is stored as the new next larger $D_{1q}$ code in register 931. If, however, the $D_{1q}$ code in input register 917 is less than the previously stored minimum $D_{1q}$ code in register 921, the code in minimum register 921 is transferred to the input of next larger register 931 and is entered therein if it is less than the previously stored next larger code in register 931. Subsequent to the transfer of the larger $D_{1q}$ code via selector 927 into next larger register 931, the input register $D_{1q}$ code is transferred into minimum register 921 via gate 911 only if the input register $D_{1q}$ code is less than the code in minimum register 921. The delayed pulse from delay 940 is used as the ED1 signal (waveform 1517) to increment sequencer 182 for the next identified digit. The $D_{1q}$ codes are sequentially formed for the identified digits 0, 1, 2, ..., Q and the minimum and next larger $D_{1q}$ codes are stored in selector 160.

After the last identified digit Q has been processed in processor 156, register 921 in selector 160 contains the minimum $D_{1q}$ code obtained for the unknown digit and register 923 contains the corresponding identifier code. Register 931 contains the next larger $D_{1q}$ code obtained for the unknown digit and register 933 contains the corresponding identifier code.

Responsive to the identified digit signal ID2 being the last identified digit Q, comparator 941 enables gate 942. At the end of the selection in selector 160, a pulse from gate 942 triggers pulse generator 943 so that gates 945, 947, and 949 are opened by an output pulse therefrom (waveform 1519). The output of gate 945 is the minimum $D_{1q}$ code ($X_1$) from register 921. The output of gate 947 is the next larger $D_{1q}$ code ($X_2$) and the output of gate 949 is the identity of the minimum $D_{1q}$ code, $ID_{min1}$.

After the formation of the last $D_{1q}$ code for an input unknown digit, consistency detector 157 is operative to test the validity of the selected identified digit. Where the selected identified digit is a one, eight or nine, all of which begin with voiced regions, consistency detector 157 provides an output signal G (waveform 1521) if the beginning boundary frame of the unknown digit is either an unvoiced frame or a silence frame. If, on the other hand, the selected identified digit is a zero, two, three, four, five, six or seven, all of which begin with unvoiced regions, consistency detector 157 provides an output signal G if the beginning boundary frame of the unknown digit is a voiced frame. Consistency detector 157 also provides an output signal G when the ratio of the next larger $D_{1q}$ value to the minimum $D_{1q}$ value is less than a predetermined threshold. In such an event, the identification by minimum selector 160 is doubtful.

Responsive to an output signal G from consistency detector 157 (waveform 1521) indicating invalidity, the aligned voiced region LPC signals of the unknown digit are applied to $D_{2q}$ processor 170 which is operative in accordance with Equations (24) and (25) to provide a more accurate correspondence signal. If, however, it is determined in detector 157 that the selected identified digit is valid, the $ID_{min1}$ code from selector 160 is transferred via gate 165 into recognized digit store 176 and the recognition mode for the unknown digit is terminated.

Figure 7:
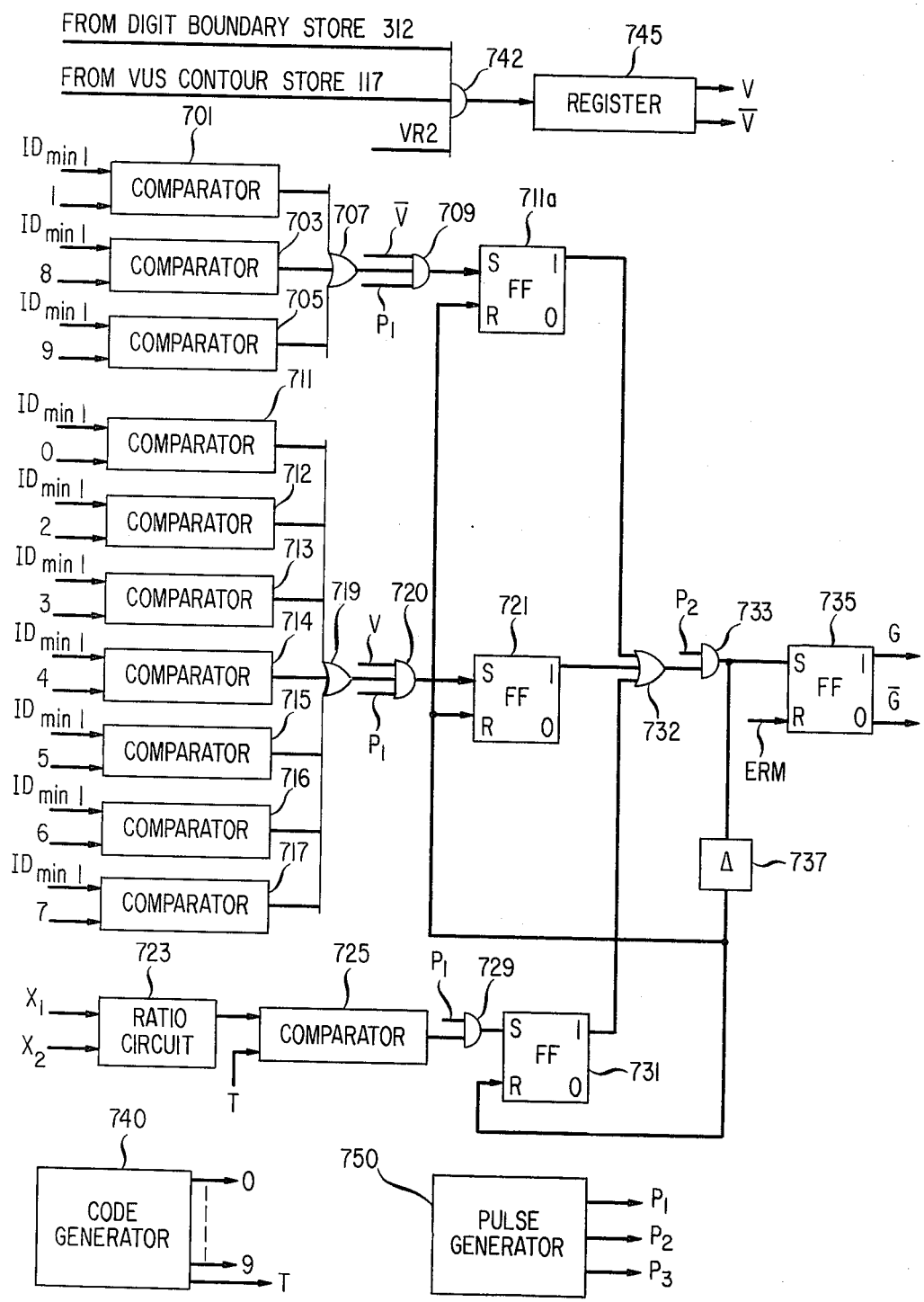
FIG. 7 shows a detailed block diagram of the consistency detector circuit of FIG. 1B.

Consistency detector circuit 157 is shown in FIG. 7. Subsequent to the digit segmentation in digit segmentor 128 for the unknown digit string, the outputs of boundary store 312 and VUS contour store 117 in lines 316 and 118, respectively, are applied to gate 742 to identify the beginning frame of each digit as a voiced, unvoiced or silence frame. The classification code for each beginning frame is stored in register 745 for use during consistency detection. After selection of the minimum $D_{1q}$ code, the classification of the unknown digit as voiced or unvoiced is made available at the output of register 745.

Assume for purposes of illustration that the unknown digit is identified as a one but that the beginning frame for the unknown digit is an unvoiced frame so that the output $\overline{V}$ of register 745 is enabled. An output signal is provided from comparators 701, 703 or 705 if the selected identified digit $ID_{min1}$ is a 1, 8 or 9. Where $ID_{min1}$ is a one, comparator 701 is operative to provide an enabling signal to gate 709 via OR gate 707. Responsive to the classification of the digit beginning frame as unvoiced, signal $\overline{V}$ also enables gate 709. Pulse generator 750 provides pulse $P_1$ at the start of the consistency detector operation whereby gate 709 causes flip-flop 711a to be set. The setting of flip-flop 711a corresponds to an inconsistency in the $D_{1q}$ identification. The one output of flip-flop 711a is supplied to gate 733 via OR gate 732 and, upon the occurrence of a subsequent $P_2$ pulse from generator 750, flip-flop 735 is set to indicate the inconsistency in the identification. The output of gate 733 is also applied to the reset input of flip-flop 711a via delay 737 to initialize flip-flop 711a for the next unknown digit.

Comparators 711–717 are operative to determine whether the selected identified digit $ID_{min1}$ is a 0, 2, 3, 4, 5, 6 or 7. In this event, an enabling signal is supplied to AND gate 720 via OR gate 719. If the beginning frame of the unknown digit is a voiced frame, gate 720 is opened responsive to pulse $P_1$ and flip-flop 721 is set. The setting of flip-flop 721 corresponds to the detection of an inconsistency in the selection of $ID_{min1}$. The one output of flip-flop 721 is then supplied via OR gate 732 and AND gate 733 to set flip-flop 735. Flip-flop 721 is then initialized to its zero state by pulse $P_2$ via delay 737.

Figure 15:
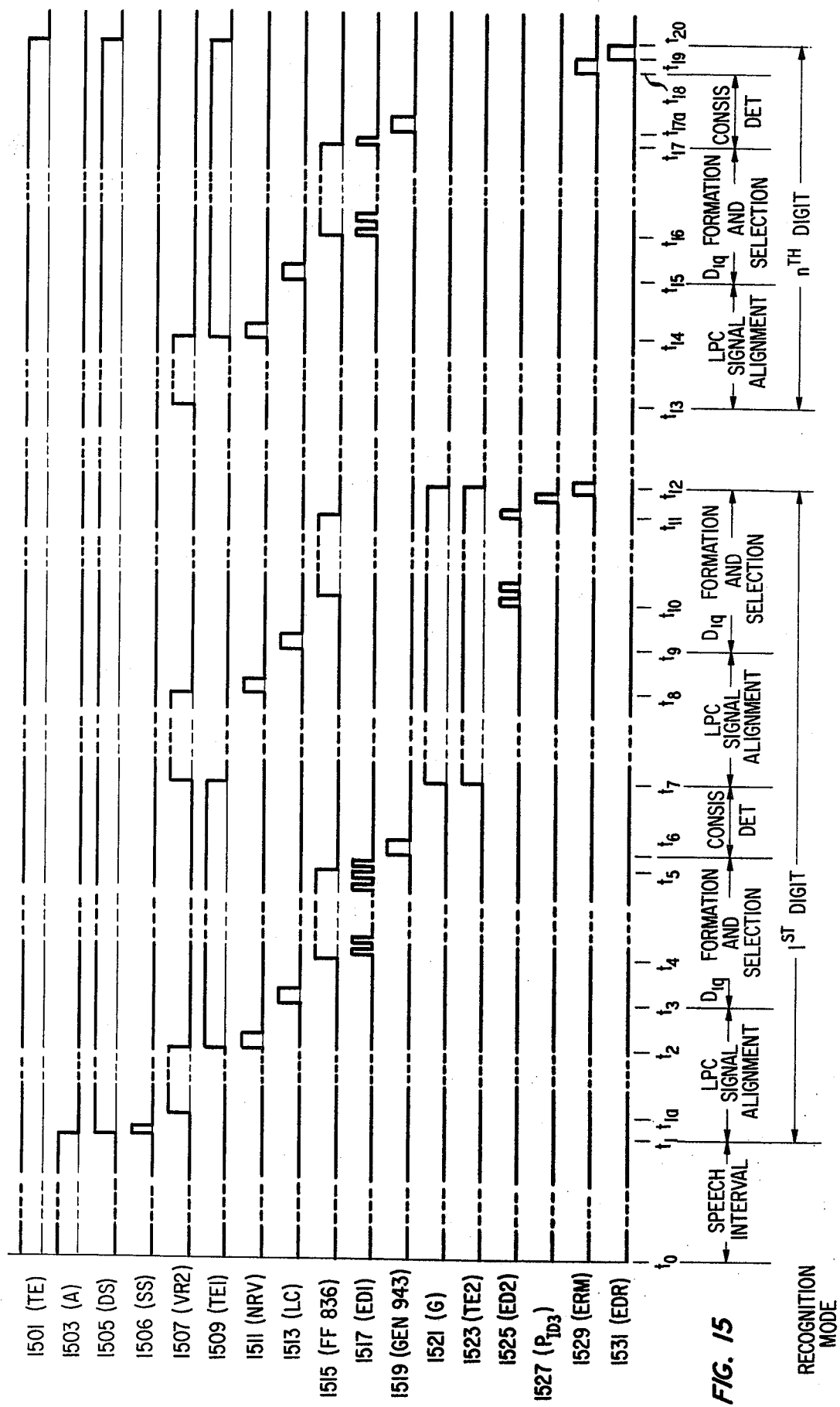

Ratio circuit 723 generates a signal corresponding to the ratio of the next larger $D_{1q}$ signal $(x_2)$ to the minimum $D_{1q}$ signal $(x_1)$. The output of ratio circuit 723 is supplied to comparator 725 together with a predetermined threshold value signal T. This threshold value may, for example, be 1.1 Responsive to the ratio $x_2$ to $x_1$, being less than T, comparator 725 provides an output to gate 729. Upon occurrence of pulse $P_1$, flip-flop 731 is set and the one output therefrom is supplied to AND gate 733 via OR gate 732. Flip-flop 735 is set upon the occurence of control pulse $P_2$ to indicate that the validity of the $D_{1q}$ identification is in doubt. Pulse generator 740 provides the coded signals 0–9 which are applied to the comparators of the consistency detector, and also provides coded signal T which is applied to comparator 725. Where an inconsistency is detected, signal G from flip-flop 735 is enabled. In the event that the identification provided by the $D_{1q}$ correspondence signal is consistent as determined in detector 157, signal $\overline{G}$ is enabled. Responsive to signal $\overline{G}$ being enabled after the consistency detection operation is completed and at the occurrence of control pulses $P_3$ from generator 750, AND gate 165 is opened and the $ID_{min1}$ code is transferred from register 923 in selector 160 to recognized digit store 176. Upon completion of this transfer, signal ERM is generated in store 176, which signal is applied to control 180 to terminate the recognition mode for this unknown digit by disabling control signals TE and TE1. In the event an inconsistency is determined by detector 157, signal G from flip-flop 735 is enabled. Responsive to the signal G, control 180 disables signal TE1 (waveform 1509) and enables signal TE2 (waveform 1523) to initiate the $D_{2q}$ correspondence signal generation as shown in FIG. 15.

As described with respect to the $D_{1q}$ generation, LPC signal aligner 152 and LPC signal store 154 are operative responsive to signal TE2 to provide the linear prediction characteristic signals needed in the generation of the $D_{2q}$ signals in processor 170. Processor 170 is responsive to the aligned prediction characteristic signals from gate 153, the covariance matrix signals $S_{iq}$ from gate 169a, the mean value signals $m_{iq}$ from gate 169b and the autocorrelation coefficient signals $r_i$ from gate 169c to produce a $D_{2q}$ signal in accordance with Equation (25). A $D_{2q}$ signal is generated for each identified digit which is identified by the coded signal ID3 derived from digit sequencer 182 and applied to store 148. Sequencer 182 is initially reset by control signal TE2 (waveform 1523) and is incremented after the formation of each $D_{2q}$ signal by control signal ED2 (waveform 1525) from selector 173.

$D_{2q}$ processor 170 may comprise a microprocessor such as one of the aforementioned microprocessors as shown in FIG. 11. In accordance with Equations (24) and (25), the microprocessor stored program control ROM 1109 is arranged to carry out the Fortran language program listing of Appendix 5. Processor 170 is operative to form a $D_{2q}$ coded signal for each identified digit determined by digit sequencer 182 and supplied by gate 185 as signal ID3. In FIG. 11, the $m_{iq}$ and $S_{iq}$ signals from reference characteristic store 148 are applied to direct memory access 1105 via lines 1130 and 1132, respectively. The autocorrelation coefficient signals $r_i$ are applied from store 139 via gate 169c and line 1140 to interface adaptor 1101, and the aligned unknown digit LPC signals from store 154 are applied via gate 153 and line 1142. The $D_{2q}$ signals from processor 170 are applied to $D_{2q}$ selector circuit 173 in sequence via line 1150. Processor 170 is started by a pulse from the one output of FF 836 (waveform 1515) of store 154 applied to interface adapter 1101, via line 154b and line 1143 (not shown). Selector 173 determines the minimum $D_{2q}$ signal and supplies the identifier code corresponding to the minimum $D_{2q}$ signal to recognized digit store 176. Selector 173 is shown in FIG. 10.

Referring to FIG. 10, pulse generator 1030 is responsive to an initialization signal from processor 170 prior to the formation of the first identified digit $D_{2q}$ signal to generate coded signal $I_n'$ and coded $I_{n1}'$. Signal $I_n'$ is applied to minimum register 1005 to insert therein the largest possible value code. Signal $I_{n1}'$ sets input register 1001, input identifier register 1003 and minimum identifier register 1007 to zero. The first $D_{2q}$ signal generated by processor 170 is inserted into input register 1001 responsive to the operation of pulse generator 1020. At this time, the ID3 signal from gate 185 is inserted as the identification code for the first identified digit into input identifier register 1003.

The output of input register 1001 is compared to the output of minimum register 1005 in comparator 1009. Responsive to the content of register 1001 being less than the content of minimum register 1005, comparator 1009 supplies an enabling signal to gate 1025. The output of pulse generator 1020 is applied to the other input of gate 1025 via delay 1023. Responsive to the operation of gate 1025, the content of input register 1001 is transferred to minimum register 1005 and the identifier code in register 1003 is inserted into minimum identifier register 1007.

Upon the occurrence of a subsequent $D_{2q}$ code, the output of pulse generator 1020 causes the new $D_{2q}$ code to be inserted into input register 1001 and also causes the corresponding identifier code ID3 to be inserted into input identifier register 1003. Comparator 1009 provides an output only if the $D_{2q}$ code in input register 1001 is less than the code stored in minimum register 1005. In this event the $D_{2q}$ code is transferred from register 1001 to minimum register 1005 and the corresponding identifier code is transferred from register 1003 to minimum identifier register 1007. Where the $D_{2q}$ code in register 1001 is equal to or larger than the previously determined minimum code in register 1005, gate 1025 is not opened and the previously determined minimum code remains in minimum register 1005. At the end of each $D_{2q}$ comparison, sequencer 182 is incremented by the ED2 pulse (waveform 1525) from delay 1028. After the last $D_{2q}$ signal code is supplied to selector 173, minimum identifier register 1007 stores the identifier code corresponding to the minimum $D_{2q}$ signal.

Comparator 1040 compares the currently occurring identifier code to the last identifier code Q. After the $D_{2Q}$ signal has been evaluated in selector 173, gate 1041 is opened and pulse generator 1042 provides a $P_{ID3}$ pulse (waveform 1527) to gate 1044. The identification code corresponding to the minimum $D_{2q}$ signal from register 1007 is gated through gate 1044 to gate 175 and is transferred therefrom to recognized digit store 176 responsive to control signal TE2 (waveform 1523). The recognition of the unknown digit is then completed. Upon the occurrence of signal ERM (waveform 1529) in recognized digit store 176, signal ERM is supplied to consistency detector 157 to reset flip-flop 737 in detector 157 and is supplied to control 180 to disable control signal TE2 (waveform 1523) and to enable control signal TE1 (waveform 1509) to condition the circuit of FIG. 1 to recognize the succeeding digit. Counter 177 receives the ERM pulses (waveform 1529) from store 176 upon recognition of each unknown digit. After the $n^{th}$ unknown digit is recognized, counter 177 generates an EDR signal (waveform 1531) which causes control 180 to terminate the recognition mode by disabling control signals TE (waveform 1501) and TE1.

FIG. 15 shows waveforms illustrating the aforementioned recognition mode operation in which the $n$ unknown digit sequence is received in a speech interval between times $t_0$ and $t_1$; the first digit recognition processing occurs between times $t_1$ and $t_{12}$; the second to $n-1^{th}$ digit processing (not shown) occurs between times $t_{12}$ and $t_{13}$; and the $n^{th}$ digit processing occurs between times $t_{13}$ and $t_{20}$. In the speech interval between times $t_0$ and $t_1$, signal A (waveform 1503) from speech interval detector 11 causes the LPC signals of the input digit sequence to be generated in generator 122 and also enables processor 115 to generate the VUS and energy contours of the unknown digit sequence. Upon termination of the speech interval at time $t_1$, signal A (waveform 1503) is disabled and signal DS (waveform 1505) becomes enabling so that digit segmentation is performed in segmenter 128. Signal SS (waveform 1506) at time $t_1$ initiates the VUS contour scan in segmenter 128. At time $t_{1a}$, signal VR2 (waveform 1507) is enabled to indicate the beginning of the voiced region of the first digit. Between times $t_{1a}$ and $t_2$, the LPC signals from store 124 are supplied to LPC signal aligner 152 via line 123 and gate 150b. At time $t_2$, coded signal NRv (waveform 1511) corresponding to the number of frames in the first digit voiced region is applied to aligner 152 from store 133 and signal TE1 (waveform 1509) is enabled. Alignment of the unknown first digit takes place between times $t_2$ and $t_3$ in aligner 152. At the end of the alignment (time $t_3$), signal LC (waveform 1513) from aligner 152 starts At time $t_{12}$, signal ERM is generated in store 176, and the second digit processing is started.

Upon termination of the $n-1^{th}$ digit processing at $t_{13}$, the processing of the $n^{th}$ digit commences. Between times $t_{13}$ and $t_{15}$, the LPC signal alignment of the unknown $n^{th}$ digit is performed in aligner 152 responsive to signal VR2 (waveform 1507). At the trailing edge of signal VR2 ($t_{14}$), signals TE1 (waveform 1509) and NRv (waveform 1511) are produced. At the end of the alignment (time $t_{15}$), signal LC (waveform 1513) is generated in aligner 152 to start the transfer of aligned LPC coefficients to store 154. Flip-flop 836 of FIG. 8 is set at time $t_{16}$ after store 154 is filled so that $D_{1q}$ formation is started in processor 156. Signal ED1 (waveform 1517) is generated at the end of each $D_{1q}$ coded signal formation and selection in selector 160. After the selection of the $D_{1Q}$ signal at $t_{17}$, generator 943 (waveform 1519) provides an output which enables consistency detector 157 at $t_{17a}$. Consistency detector 157 is operative between $t_{17a}$ and $t_{18}$. It is assumed that the beginning frame of the $n^{th}$ digit is consistent with $ID_{min_1}$. Signal G is not enabled at $t_{18}$ so that the $ID_{min_1}$ coded signal from minimum selector 160 is transferred to store 176. Signals ERM (waveform 1529) and EDR (waveform 1531) are then generated at times $t_{18}$ and $t_{19}$, respectively. Responsive to signal EDR, signals TE, TE1 and DS are disabled in control 180 and interval detector 111 at time $t_{20}$, and the recognition mode is terminated.

While the invention shown and described with reference to a particular illustrative embodiment, it is to be understood that various modifications in form and detail may be made by those skilled in the art without departing from the spirit and scope of the invention. For example, the described speech recognition arrangement may be modified to identify an unknown speech segment such as a prescribed word, or may be modified to identify an unknown speech segment as one of a plurality of identified words.

Appendix 1                    Rabiner-Sambur 8

```
C       SUBROUTINE TO PERFORM VOICED-UNVOICED-SILENCE ANALYSIS OF A
C       BLOCK OF SPEECH SAMPLES
C       S IS THE ARRAY OF SPEECH SAMPLES
C       KI IS THE INDEX OF THE FIRST SAMPLE IN THE BLOCK
C       KL IS THE INDEX OF THE LAST SAMPLE IN THE BLOCK
C       L IS THE FINAL V/U/S DECISION--L=1 FOR SILENCE
C                                      L=2 FOR UNVOICED
C                                      L=3 FOR VOICED
C       RX IS THE MEAN ARRAY OBTAINED FROM THE V/U/S REFERENCE STORE
C       SD IS THE STANDARD DEVIATION ARRAY OBTAINED FROM THE REFERENCE
C       COV IS THE COVARIANCE ARRAY FROM THE REFERENCE STORE
        SUBROUTINE VUS(S,KI,KL,L,RX,SD,COV)
        DIMENSION S(1)
        DIMENSION RX(5,3),SD(5,3),COV(5,5,3)
        DIMENSION P(4),C(5),A(3),T(3),Q(15),PD(50)
C       A 2-POLE LPC ANALYSIS IS USED FOR V/U/S
        NP=2
C       COMPUTE ZERO CROSSINGS IN THE BLOCK--NZER
        CALL ZERCRS(S,KI,KL,NZER)
C       COMPUTE CORRELATION COEFFICIENTS--P,C
        CALL CRMTRX(S,KI,KL,NP,P,C)
C       COMPUTE ENERGY-PS
        CALL INPROD(S(KI),S(KI),KL-KI+1,PS)
        XN=1./FLOAT(KL-KI+1)
        PSS=SQRT(PS*XN)
        PP=SQRT(PS*P(1))
        CALL PRDPLY(P,C,A,NP,T,M)
        CALL INPROD(C,A(2),M,PC)
C       FORM 5 PARAMETERS IN Q ARRAY
        Q(1)=NZER
        Q(2)=10.*ALOG10(PS*XN)
        Q(3)=Q(2)-10.*ALOG10(XN*(PC+PS))
        Q(4)=A(2)
        Q(5)=C(1)/PP
C       MAKE DISTANCE MEASUREMENTS AND SELECT MINIMUM
        SMIN=1.E30
        DO 20 K=1,3
        DO 10 I=1,5
   10   C(I)=(Q(I)-RX(I,K))/SD(I,K)
        NSQ=25
        CALL MOVE(W(1,1,K),PD,NSQ)
        CALL PRDPLY(PD,C,T,S,PD(NSQ+1),M)
        CALL INPROD(C,T(2),M,SM)
        IF((-SM).GT.SMIN) GO TO 20
        SMIN=-SM
        L=K
   20   CONTINUE
        RETURN
        END

C INPROD      INNER PRODUCT OF TWO VECTORS
C             JAN 16, 1973
        SUBROUTINE INPROD(A,B,L,PROD)
        DIMENSION A(1),B(1)
C       PROD=A(1)*B(1)+A(2)*B(2)+.........+A(L)*B(L)
        PROD=0.
        DO1I=1,L
    1   PROD=PROD+A(I)*B(I)
        RETURN
```

```
CMOVE         MOVE CONTENTS OF X TO Y
C      JAN 15, 1973
       SUBROUTINE MOVE(X,Y,N)
       DIMENSION X(1),Y(1)
       DO1I=1,N
     1 Y(I)=X(I)
       RETURN
       END

CZERCRS       COMPUTE ZEROCROSSINGS FOR UNVOICED/VOICED DECISION
       SUBROUTINE ZERCRS(S,LP,NS,NZER)
       DIMENSION S(1)
       NZER=0
       SPREV=S(LP-1)
       DO1K=LP,NS
       SPRES=S(K)
       IF(SPRES.LT.0..AND.SPREV.LT.0.)GOTO1
       IF(SPRES.GT.0..AND.SPREV.GT.0.)GOTO1
       NZER=NZER+1
     1 SPREV=SPRES
       RETURN
       END

CCRMTRX       COMPUTE CORRELATION MATRIX OF SPEECH WAVE
C      121869
C          CHECKED 1/6/72
       SUBROUTINE CRMTRX(S,KI,KL,NP,PHI,SHI)
       DIMENSIONS(1),SHI(1),PHI(NP,NP)

C      S = INPUT SPEECH SIGNAL ARRAY
C      PHI = OUTPUT COVARIANCE MATRIX
C      SHI = OUTPUT CORRELATION FUNCTION
C      NP = MAXIMUM DELAY IN SAMPLES
C      KI = FIRST SPEECH SAMPLE TO BE USED
C      KL = LAST SPEECH SAMPLE TO BE USED

NPP=NP
       K1=KI
       K2=KL

DO10I=1,NPP
       SHI(I)=0.
       DO5J=K1,K2
       JP=J-I
     5 SHI(I)=SHI(I)+S(J)*S(JP)
    10 CONTINUE

PS=0.
       DO6J=K1,K2
     6 PS=PS+S(J)*S(J)

PHI(1,1)=PS+S(K1-1)*S(K1-1)-S(K2)*S(K2)

DO11I=2,NPP
       KII=K1-I
       KLL=K2-I+1
    11 PHI(I,I)=PHI(I-1,I-1)+S(KII)*S(KII)-S(KLL)*S(KLL)
       PHI(1,2)=SHI(1)+S(K1-1)*S(K1-2)-S(K2)*S(K2-1)
       PHI(2,1)=PHI(1,2)
       IF(NP.LE.2) RETURN
       DO12J=3,NPP
       KIJ=K1-J
       KLJ=K2-J+1
       PHI(1,J)=SHI(J-1)+S(K1-1)*S(KIJ)-S(K2)*S(KLJ)
    12 PHI(J,1)=PHI(1,J)

NPP=NP-1
       DO15I=2,NPP
       J1=I+1
```

Appendix 1 (Continued)

```
      DO16J=J1,NP
      KII=K1-I
      KIJ=K1-J
      KLI=K2-I+1
      KLJ=K2-J+1
      PHI(I,J)=PHI(I-1,J-1)+S(KII)*S(KIJ)-S(KLI)*S(KLJ)
   16 PHI(J,I)=PHI(I,J)

15 CONTINUE

RETURN
      END

CPRDPLY    SOLVE MATRIX EQUATION AX = Q
C    121869
C       CHECKED 2/4/74
      SUBROUTINE PRDPLY(A,Q,X,NP,P,M)
      DIMENSIONA(NP,NP),Q(1),X(1),P(1)

C     PROGRAM TO SOLVE THE MATRIX EQUATION AX = -Q
C     A = S(TR) * S
C     Q = S(TR) * P
C     P = S * X
C     M = 0   MATRIX A IS SINGULAR
C     S IS STORED IN THE UPPER HALF OF A
C     DIAGONAL TERMS OF S ARE STORED TEMPORARILY IN X

N=NP
  500 CONTINUE

IF(N.EQ.0)GOTO300
      DO100I=1,N
      LMX=I-1
      SM1=0.
      SM2=0.
      IF(I.EQ.1)GOTO210

DO50L=1,LMX
      SM1=SM1+A(L,I)*A(L,I)
   50 SM2=SM2+A(L,I)*P(L)

210 SK=A(I,I)-SM1
      IF(SK.LE.(1.0E-7))GOTO400

X(I)=1./SQRT(SK)
      P(I)=(Q(I)-SM2)*X(I)
      JMN=I+1
      IF(I.EQ.N)GOTO100

DO60J=JMN,N
      SM=0.
      IF(LMX.EQ.0)GOTO60

DO70K=1,LMX
   70 SM=SM+A(K,I)*A(K,J)

60 A(I,J)=(A(J,I)-SM)*X(I)

100 CONTINUE

700 CONTINUE
      DO200I=1,N
      NN=N-I+1
      SM=0.
      IF(NN.EQ.N)GOTO150
```

Appendix 1 (Continued)

```
            JMN=NN+1
            DO180L=JMN,N
   180      SM=SM-A(NN,L)*X(L+1)

150      X(NN+1)=(SM-P(NN))*X(NN)
   200      CONTINUE

X(1)=1.
            M=N
            P(1)=P(1)*P(1)
            DO800J=2,N
   800      P(J)=P(J-1)+P(J)*P(J)
   10       IF(N.EQ.NP) RETURN
            J1=N+1
            DO 40 J=J1,NP
            P(J)=P(J-1)
   40       X(J+1)=0.
            RETURN
   300      CONTINUE
            M=N
            X(1)=1.
            GOTO10
   400      N=LMX
            IF(N.EQ.1)GOTO300
            GOTO700
            END
```

Appendix 2

```
C           SUBROUTINE TO COMPUTE MEANS AND COVARIANCES FOR DATA ENTERING
C           IN THE FOLLOWING WAY--A1(1),A2(1),A3(1),...ANL(1)--A1(2),A2(2),
C           A3(2),...ANL(2)--...--A1(NP),A2(NP),...ANL(NP)
C           XM IS THE MEAN ARRAY OF LENGTH NP*NL
C           XCOV IS THE COVARIANCE ARRAY--IT IS 3-DIMENSIONAL--DIMENSIONS
C           1 AND 2 ARE THE ROWS AND COLUMNS--DIMENSION 3 IS THE FRAME NO
C           IT IS ASSUMED INITIALLY THAT XM AND XCOV ARRAYS ARE ZEROED OUT
C           NP IS THE NUMBER OF PREDICTOR PARAMATERS--TYPICALLY 12
C           XNEW IS THE DATA ENTERING THE ROUTINE
C           NL IS THE NUMBER OF FRAMES IN THE TIME ALIGNED SIGNAL
C           NCT IS A COUNTER FOR THE NUMBER OF REPETITIONS--NCT IS ASSUMED
C           TO BE SET TO 0 INITIALLY
            SUBROUTINE XMXCOV(XM,XCOV,NP,XNEW,NCT,NL)
            DIMENSION XM(1),XCOV(1),XNEW(1)
            NT=NL*NP
            DO 10 I=1,NT
   10       XM(I)=XM(I)+XNEW(I)
            DO 20 K=1,NL
            DO 20 I=1,NP
            I1=NL*(I-1)+K
            DO 20 J=1,NP
            J1=NL*(J-1)+K
   20       XCOV(I,J,K)=XCOV(I,J,K)+XNEW(I1)*XNEW(J1)
            NCT=NCT+1
            RETURN
            END
```

```
C       THIS ROUTINE IS USED AFTER ALL REPETITIONS HAVE BEEN USED
C          IT PERFORMS THE FINAL AVERAGING OF THE MEAN AND COVARIANCE ARRAYS
        SUBROUTINE XNORM(XM,XCOV,NP,NCT,NL)
        DIMENSION XM(1),XCOV(1)
        NT=NL*NP
        DO 10 I=1,NT
10      XM(I)=XM(I)/FLOAT(NCT)
        DO 20 K=1,NL
        DO 20 I=1,NP
        I1=NL*(I-1)+K
        DO 20 J=1,NP
        J1=NL*(J-1)+K
20      XCOV(I,J,K)=XCOV(I,J,K)/FLOAT(NCT)-XM(I1)*XM(J1)
        RETURN
        END
```

Appendix 3

```
CPRDCOR    AUTOCORRELATION FN OF A RECURSIVE FILTER
        SUBROUTINEPRDCOR(A,R)
C       A=POLYNOMIAL OF DEGREE LA-1; R=AUTOCORRELATION FN. OF LENGTH LR
C       (SUM(R(1+ABS(I-J))*A(J)),J=2,LA)=-R(I),I=2,LR
C       COMPUTE AUTOCORRELATION FUNCTION FOR A GIVEN PREDICTOR
C       A(K) IS THE COEFFICIENT OF THE TERM Z**(-(K-1))
C       T=TEMPORARY SCRATCH ARRAY
        DIMENSIONA(1),R(1),T(50)
        LA=13
C       NORMALIZE FIRST COEFF OF POLY TO UNITY AND STORE IN R
        DO1K=2,LA
1       R(K)=A(K)/A(1)
        R(1)=1.

L=LA+1
C       COMPUTE REFLECTION COEFFS AND STORE IN R
2       L=L-1
        R(L)=-R(L)
        RL=R(L)
        RL=ABS(RL)
        D=1./(1.-R(L)*R(L))
        KL=(L-1)/2
        DO12J=1,KL
        LJ=L-J
        RJ=R(J+1)+R(L)*R(LJ)
        RLJ=R(LJ)+R(L)*R(J+1)
        R(J+1)=D*RJ
12      R(LJ)=D*RLJ
        IF(L.GT.3)GOTO2
        R2=R(2)
        R2=ABS(R2)
        R(2)=-R(2)
        T(1)=1.
        T(2)=-R(2)
C.      ARRAY R CONTAINS THE REFLECTION COEFFICIENTS
C       COMPUTE PREDICTOR POLY OF DIFF DEG AND STORE IN T
C       COMPUTE AUTOCORRELATION FUNCTION AND STORE INTO R
```

Appendix 3 (Continued)

```
       LM=LA
       DO15K=3,LM
       KL=K-1
       JL=KL/2
       DO22J=1,JL
       KJ=K-J
       TJ=T(J+1)-R(K)*T(KJ)
       TKJ=T(KJ)-R(K)*T(J+1)
       T(J+1)=TJ
 22    T(KJ)=TKJ
       T(K)=-R(K)
       KLL=KL-1
       DO3J=1,KLL
       KJ=K-J
 3     R(K)=R(K)-R(KJ)*T(J+1)
 15    CONTINUE
 110   RETURN
       END
```

Appendix 4

```
       SUBROUTINE D1(A,AEST,R,RRES,D,ICONT,NF,DAV)
C      CALCULATES THE DISTANCE D1 BETWEEN THE MEAN LPC VECTOR A AND THE
C      MEASURED VECTOR AEST.
C      R IS THE NORMALIZED AUTOCORRELATION VECTOR
C      RRES IS THE NORMALIZED ERROR
C      ICONT IS THE FRAME NUMBER PRESENTLY ANALYZED
C      NF IS THE NUMBER OF FRAMES IN THE UTTERANCE
C      DAV IS THE AVERAGE D1
       DIMENSION R(1),A(1),AEST(1),RA(20),RR(20),AD(20),SUM(20)
       M=12
       IF(ICONT.EQ.0) DAV=0.0
C      FORM AUGMENTED VECTOR
       MP1=M+1
       RA(1)=1.0
       DO 1 I=2,MP1
       RA(I)=R(I-1)
 1     CONTINUE
C      FIND DIFFERRENCE BETWEEN A AND AEST
       AD(1)=0.0
       DO 2 I=1,M
       II=I+1
       AD(II)=A(I)-AEST(I)
 2     CONTINUE
C      FIND AD.RA(MATRIX).AD
C      FIRST AD.RA(MATRIX)
       DO 3 I=1,MP1
C      FORM I TH COLUMN OF THE AUGMENTED CORRELATION MATRIX
       CALL ROTAT(RA,RR,MP1,I)
       CALL DOT(AD,RR,C,MP1)
       SUM(I)=C
 3     CONTINUE
       CALL DOT(SUM,AD,D,MP1)
C      RRES=RESIDUAL ERROR
       D=D/RRES
       DAV=DAV+(D/FLOAT(NF))
       RETURN
       END
```

Appendix 4 (Continued)

```
      SUBROUTINE DOT(A,B,C,M)
C     COMPUTES THE DOT PRODUCT OF THE VECTORS A AND B(LENGTH M)
      DIMENSION A(1),B(1)
      C=0.0
      DO 1 I=1,M
      C=C+A(I)*B(I)
 1    CONTINUE
      RETURN
      END

SUBROUTINE ROTAT(R,RR,M,I)
C     FORMS THE I TH COLUMN OF THE CORRELATION MATRIX
C     COLUMN STORED IN RR
      DIMENSION RR(1),R(1)
      K=0
      DO 2 J=I,M
      K=K+1
      RR(J)=R(K)
 2    CONTINUE
      IF(I.EQ.1) RETURN
      II=I-1
      K=II+1
      DO 1 J=1,II
      K=K-1
      RR(K)=R(J+1)
 1    CONTINUE
      RETURN
      END
```

Appendix 5

```
      SUBROUTINE D2(A,AMEAN,RRES,R,S,D,ICONT,NF,DAV)

C     CALCULATES THE DISTANCE D2
C     A=MEASURED LPC,AMEAN=MEANS OF LPC,R=NORM AUTOCORRELATION,M=# OF PR
C     RRES=NORM ERROR
C     S=COVARIANCE OF REFERENCE
C     ICONT IS THE FRAME NUMBER PRESENTLY ANALYZED
C     NF IS THE NUMBER OF FRAMES IN THE UTTERANCE
C     DAV IS THE AVERAGE D1
      DIMENSION SUM(12),R(1),RR(12),A(1),AMEAN(12),S(M,1),AD(12)
      DIMENSION SS(144),TT(144)
      M=12
      NANAL=200.0
      IF(ICONT.EQ.0) DAV=0.0
C     FIND DIFFERENCE VECTOR
      DO 1 I=1,M
 1    AD(I)=A(I)-AMEAN(I)
C     GET COVARIANCE MATRIX OF ESTIMATION ERROR
      DO 99 I=1,M
      II=I+1
 99   RR(II)=R(I)
      R(1)=1.0
      DO 98 I=2,M
```

Appendix 5 (Continued)

```
98      R(I)=RR(I)
        I=0
        DO 2 J=1,M
        CALL ROTAT(R,RR,M,J)
        DO 3 K=1,M
        I=I+1
         SS(I)=RR(K)/RRES
        SS(I)=SS(I)*FLOAT(NANAL)
3       CONTINUE
2       CONTINUE
        MSQ=M*M
        CALL MATINV(SS,TT,M,MS,DET)
        IF(MS.EQ.1) STOP
        DO 15 I=1,MSQ
15      SS(I)=TT(I)
        I=0
        DO 6 J=1,M
        DO 7 K=1,M
        I=I+1
        SS(I)=SS(I)+S(K,J)
7       CONTINUE
6       CONTINUE
C       FIND WEIGHTING MATRIX FOR DIST CALCULATION
        CALL MATINV(SS,TT,M,MS,DET)
        IF(MS.EQ.1) STOP
        DO 10 I=1,MSQ
10      SS(I)=TT(I)
C       FIND DIST
        D=0.0
        K=0
        DO 4 I=1,M
        SUM(I)=0.0
        DO 5 J=1,M
        K=K+1
        SUM(I)=SUM(I)+AD(J)*SS(K)
5       CONTINUE
        D=D+SUM(I)*AD(I)
4       CONTINUE
        DAV=DAV+(D/FLOAT(NF))
        RETURN

END

SUBROUTINE MATINV(A,B,N,MS,DET)
        DIMENSION A(N,N),B(N,N)
C         MATRIX A IS INVERTED BY CHOLESKI DECOMPOSITION
C         LET A = L* L(TRANS) - L IS LOWER TRIANGULAR
C         THEN B= A(INV) = L(INV)TR * L(INV)
C         L IS STORED TEMPORARILY IN B
C         DET = DET(A)
C         MS =1 IF MATRIX IS SINGULAR
C         MS = 0 IF MATRIX IS NONSINGULAR
C
        M=N
        MP1=M+1
        DET=1.
        DO100J=1,M
        JM1=J-1
        JP1=J+1
        SM=A(J,J)
        IF(J.EQ.1)GOTO102
        DO101K=1,JM1
101     SM=SM-B(J,K)*B(J,K)
102     IF(SM.LE.0.)GOTO500
        B(J,J)=SQRT(SM)
        DET=DET*B(J,J)
        XL=1./B(J,J)
```

Appendix 5 (Continued)

```
      IF(J.EQ.M)GOTO110
      DO100I=JP1,M
      SM=A(I,J)
      IF(J.EQ.1)GOTO104
      DO103K=1,JM1
  103 SM=SM-B(I,K)*B(J,K)
  104 CONTINUE
  100 B(I,J)=SM*XL
  110 CONTINUE
C
C           COMPUTE INVERSE OF L (STORED IN B)
      DO350J=1,M
  350 B(J,J)=1./B(J,J)
      NM1=M-1
      DO200J=1,NM1
      JP1=J+1
      DO200I=JP1,M
      IM1=I-1
      SM=0.
      DO202K=J,IM1
  202 SM=SM+B(I,K)*B(K,J)
  200 B(I,J)=-SM*B(I,I)
C
C           COMPUTE A (INV)
      DO300J=1,M
      JM=MP1-J
      DO300I=1,JM
      SM=0.
      DO302K=JM,M
  302 SM=SM+B(K,I)*B(K,JM)
      B(I,JM)=SM
  300 CONTINUE
      DO400I=1,M
      DO400J=1,I
  400 B(I,J)=B(J,I)
      MS=0
      RETURN
C
  500 CONTINUE
C           SINGULAR MATRIX A
      MS=1
      RETURN
      END
```

What is claimed is:

1. A speech recognizer comprising means responsive to repetitions of a continuous string of connected identified speech segments for partitioning said continuous string of connected identified speech segments into its identified speech segments, means for generating a set of reference signals corresponding to each identified speech segment representative of the mean values of prediction characteristics of the average of the voiced intervals of the repetitions of said identified speech segment, means responsive to a continuous string of connected speech segments including at least one unknown speech segment for partitioning said continuous string of connected speech segments into its speech segments, means for generating a set of test signals representative of the prediction characteristics of the voiced interval of said unknown speech segment, means for time aligning the test signals to the average voiced interval of each identified speech segment, means jointly responsive to said set of time aligned test signals and each set of reference signals for producing a signal representative of the correspondence between said time aligned voiced interval test signals and said voiced interval reference signals, and means responsive to said correspondence signals for recognizing said unknown speech segment as one of said identified speech segments.

2. A speech recognizer according to claim 1 wherin each of said partitioning means comprises means for dividing said continuous string of connected speech segments into predetermined frames of speech, means for classifying each speech frame as one of voiced speech, unvoiced speech and silence, means for generating a signal for each speech frame representative of the energy of the speech of said frame, means responsive to the occurrence of one of an unvoiced speech frame and a silence frame immediately succeeding a voiced frame for identifying said one of said unvoiced frame and silence frame as a speech segment boundary frame, means for comparing the number of boundary frames to the number of speech segments, and means responsive to the number of boundary frames being less than the number of speech segments for identifying energy minima frames as speech segment boundary frames.

3. A speech recognizer for identifying an unknown speech segment in a continuous speech signal as one of a plurality of identified speech segments comprising means responsive to repetitions of strings of identified speech segments for generating a set of reference signals for each identified speech segment representative of the means and variances of the linear prediction characterstics of the average voiced intervals of said identified speech segment;

means responsive to a string of unknown speech segments for partitioning said string into said unknown speech segments;

means responsive to each partitioned unknown speech segment for generating a set of test signals representative of the linear prediction characteristics of the voiced intervals of said partitioned unknown speech segment;

means for time aligning said set of test signals to the average voiced intervals of each identified speech segment;

means for forming a first correspondence signal representative of the correspondence between said aligned voiced interval test signals and said voiced interval reference signals for each identified speech segment;

means for selecting the identified speech segment having the least first correspondence signal;

means for generating a signal representative of the classification of the beginning of said unknown speech segment as one of voiced, unvoiced and silence;

means jointly responsive to said classification signal, said selected identified speech segment identity and said first correspondence signals for generating a first signal when said classification signal is consistent with said selected identity and a second signal when said classification signal is inconsistent with said selected identity;

means responsive to said first signal for identifying said unknown speech segment as said selected identified speech segment;

means responsive to said second signal for forming a second correspondence signal from said aligned voiced interval test signals and said voiced interval reference signals for each identified speech segment;

and means responsive to the second correspondence signals for identifying said unknown speech segment as the identified speech segment having the least second correspondence signal.

4. A speech recognizer for identifying an unknown speech segment in a continuous speech signal as one of a plurality of identified speech segments according to claim 3 wherein said unknown speech segment is an unknown spoken digit and each identified speech segment is an identified spoken digit.

5. A speech recognizer for identifying an unknown spoken digit in a continuous string of spoken digits comprising means responsive to repetitions of identified digit strings by different speakers for generating a set of reference signals for each identified digit representative of the mean values $m_{iq}$ of the linear prediction coefficients of the average voiced interval of said identified digit and the covariance $S_{iq}$ of said linear prediction coefficients where $i = 1, 2, \ldots,$ $\overline{N}\nu$ is the $i^{th}$ frame of the identified digit average voiced interval of $\overline{N}\nu$ frames and $q = 1, 2, \ldots, Q$ is the identity of said identified spoken digit, means for partitioning said continuous string of spoken digits including said unknown spoken digit into its component spoken digits.

means responsive to said partitioned unknown spoken digit in said string of spoken digits for generating a set of test signals $a(n)_i$ representative of the linear prediction coefficients of the unknown digit voiced interval where $n = 1, 2, \ldots, p$ is the order of the coefficient and a signal $R_i$ representative of the autocorrelation coefficients of said unknown digit where $i = 1, 2, \ldots, N\nu$ is the $i^{th}$ frame of the unknown voiced interval of $N\nu$ frames, means for determining the correspondence between the unknown digit voiced interval test signals $a(n)_i$ and each identified digit $(q = 1, 2, \ldots, Q)$ voiced interval reference signals $m_{iq}$ comprising means for time aligning said test signals $a(n)_i$ for the unknown digit voiced interval frames $i = 1, 2, \ldots, N\nu$ to the average reference set voiced interval frames $i = 1, 2, \ldots, \overline{N}\nu$ to from a set of $\overline{N}\nu$ aligned test signals $a_i'$ corresponding to the $N\nu$ test signals $a(n)_i$, means jointly responsive to said aligned test signals $a_i'$, $R_i$, and said $q^{th}$ identified digit reference signals $m_{iq}$ for forming a signal $$D_{1q} = \frac{1}{\overline{N}\nu} \sum_{i=1}^{\overline{N}\nu} (\hat{a}_i' - m_{iq})R_i^{-1}(\hat{a}_i'R_i\hat{a}_i')(\hat{a}_i' - m_{iq})'$$

representative of the correspondence between said voiced interval test signals $\hat{a}_i'$ and said $q^{th}$ identified digit voiced interval reference signals $m_{iq}$, and means responsive to said correspondence signals $D_{1q}$ for selecting the identified digit having the minimum correspondence signal $D_{1q}$.

6. A speech recognizer according to claim 5 wherein said test signal generating means comprises means for producing a classification signal for the beginning frame of said unknown spoken digit as one of voiced, unvoiced, and silence; and further comprises means jointly responsive to said classification signal, said $D_{1q}$ correspondence signals and the identity of said identified digit having the minimum correspondence signal $D_{1q}$ for generating a first signal responsive to an inconsistency between said classification signal and the identity of said identified digit having the minimum correspondence signal $D_{1q}$; means responsive to said first signal for forming a second correspondence signal $$D_{2q} = \frac{1}{\overline{N}\nu} \sum_{i=1}^{\overline{N}\nu} (\hat{a}_i' - m_{iq})(S_{iq} + \frac{R_i^{-1}(\hat{a}_i'R_i\hat{a}_i')}{N})(\hat{a}_i' - m_{iq})'$$

for each $q^{th}$ identified digit $q = 1, 2, \ldots, Q$; and means responsive to said second correspondence signals for identifying said unknown digit as the identified digit $q$ having the least $D_{2q}$ correspondence signal.

7. A speech recognizer for identifying an unknown spoken digit in a continuous string of spoken digits comprising means responsive to repetitions of identified digit strings for generating a set of reference signals for each identified digit representative of the mean values $m_{iq}$ of the linear prediction coefficients of the average voiced interval of said identified digit and the covariance $S_{iq}$ of said linear prediction coefficients where $i = 1, 2, \ldots, \overline{N}v$ is the $i^{th}$ frame of the identified digit average voiced interval of $\overline{N}v$ frames and $q = 1, 2, \ldots, Q$ is the identity of said identified spoken digit, means for partitioning said continuous string of spoken digits into its component spoken digits including said unknown spoken digit, means responsive to said partitioned unknown spoken digit for generating a set of test signals $a(n)_i$ representative of the linear prediction coefficients of the unknown digit voiced interval where $n = 1, 2, \ldots, p$ the order of the coefficient and a signal $R_i$ representative of the autocorrelation coefficients of said unknown digit and $i = 1, 2, \ldots, Nv$ is the $i^{th}$ frame of the unknown voiced interval of $Nv$ frames, means for determining the correspondence between the unknown digit voiced interval test signals $a(n)_i$ and each $q^{th}$ identified digit $(q = 1, 2, \ldots, Q)$ voiced interval reference signals $m_{iq}$ comprising means for time aligning said test signals $a(n)_i$ for the unknown digit voiced interval frames $i = 1, 2, \ldots, Nv$ to the average reference set voiced interval frames $i = 1, 2, \ldots, \overline{N}v$ to form $\overline{N}v$ aligned test signals $a_i'$ corresponding to said $Nv$ test signals $a(n)_i$; means jointly responsive to said aligned voiced interval test signals $a_i'$, $R_i$, and said $q^{th}$ identified digit voiced interval reference signals $m_{iq}$, for forming a signal $$D_{2q} = \frac{1}{\overline{N}v} \sum_{i=1}^{\overline{N}v} (\hat{a}_i' - m_{iq})(S_{iq} + \frac{R^{-1}(\hat{a}_i' R_i \hat{a}_i')}{N})(\hat{a}_i' - m_{iq})'$$

representative of the correspondence between said voiced interval test signals $a_i'$ and said $q^{th}$ identified digit voiced interval reference signals $m_{iq}$, for each $q^{th}$ digit; and means responsive to said correspondence signals $D_{2q}$ for identifying said unknown digit as the identified digit $q$ having the minimum correspondence signal $D_{2q}$.

8. A method for recognizing an unknown speech segment of a continuous speech signal as a previously identified speech segment comprising the steps of generating a set of prescribed reference signals for each identified speech segment representative of the mean values of the linear prediction coefficients of the average voiced region of said identified speech segment from a plurality of utterances including said identified speech segment; partitioning said continuous speech signal into its speech segments; generating a set of test signals representative of the linear prediction coefficients of the voiced region of said partitioned unknown speech segment; time aligning said unknown speech segment voiced region test signals to the average voiced region of each identified speech segment, jointly responsive to said time aligned test signals and said reference signals, producing a first correspondence signal representative of the correspondence of said time aligned voiced region test signals and said average voiced region reference signals for each identified speech segment; selecting the identified speech segment having the least first correspondence signal; generating a signal representative of the classification of the beginning of said unknown speech segment as one of voiced, unvoiced and silence; producing a first signal when said classification signal is consistent with said selected identified speech segment and a second signal when said classification signal is inconsistent with said selected identified speech segment; responsive to said first signal, identifying said unknown speech segment as said selected identified speech segment; responsive to said second signal, forming a second correspondence signal from said aligned voiced region test signals and said average voiced region reference signals for each identified speech segment, and identifying said unknown speech segment as said identified speech segment having the least second correspondence signal.

9. A method for recognizing an unknown speech segment of an utterance according to claim 8 wherein said partitioning step comprises dividing said continuous speech signal into predetermined speech frames; classifying each speech frame as one of voiced speech, unvoiced speech, and silence, and generating a signal for each speech frame representative of the energy of the speech of said frame; identifying the unvoiced and silence frame immediately succeeding a voiced frame as a speech segment boundary frame; comparing the number of boundary frames to the number of speech segments; and responsive to the number of boundary frames being less than the number of speech segments, identifying energy minima frames as speech boundary frames until the number of boundary frames equals the number of speech segments.

10. A method for identifying an unknown speech segment in a continuous speech signal as one of a plurality of identified speech segments comprising the steps of generating a set of reference signals for each identified speech segment representative of the mean value $m_{iq}$ and variances $S_{iq}$ of the linear prediction characteristics of the average voiced intervals of said identified speech segment responsive to repetitions of strings of said identified speech segments where $i = 1, 2, \ldots, \overline{N}v$ are the frames of the average voiced intervals and $q = 1, 2, \ldots, Q$ is the identity of the identified speech segment; generating a set of test signals $a(n)_i$ representative of the linear prediction coefficients of the voiced intervals of said unknown speech segment where $n = 1, 2, \ldots, p$ is the order of the coefficients and a signal $R_i$ representative of the autocorrelation coefficients of the voiced intervals of the unknown speech segment where $i = 1, 2, \ldots, Nv$; determining the correspondence between said test signals and each identified speech segment reference signal comprising time aligning said unknown speech segment voiced interval test signals to the average voiced intervals of said identified speech segment to form a set of $\overline{N}v$ test signals $a_i'$ corresponding to the $Nv$ test signals $a(n)_i$ jointly responsive to said aligned test voiced interval signals $a_i'$ and said identified speech segment voiced interval reference signals $m_{iq}$, producing a signal $$D_{1q} = \frac{1}{\overline{N}v} \sum_{i=1}^{\overline{N}v} (\hat{a}_i' - m_{iq}) R_i^{-1} (\hat{a}_i' R_i \hat{a}_i')(\hat{a}_i' - m_{iq})'$$

representative of the correspondence between said aligned voiced interval test signals $a_i'$ and said identified speech segment average voiced interval reference signals $m_{iq}$; selecting and storing the identity of the identified speech segment having the minimum $D_{1q}$ signal; producing a signal classifying the beginning frame of said unknown speech segment as one of voiced, unvoiced and silence; jointly responsive to said classifying signal and the identity of the unknown speech segment having the minimum $D_{1q}$ signal, generating a first signal when said classifying signal is consistent with said minimum $D_{1q}$ signal identity and a second signal when said classifying signal is inconsistent with said minimum $D_{1q}$ signal identity: identifying said unknown speech segment as said minimum $D_{1q}$ correspondence signal identity responsive to said first signal; responsive to said second signal, forming a $$D_{2q} = \sum_{i=1}^{\overline{N}v} (\hat{a}'_i - \underline{m}_{iq})(S_{iq} + \frac{R^{-1}(\hat{a}'_i R_i \hat{a}'^t_i)}{N})(\hat{a}'_i - \underline{m}_{iq})^t$$

correspondence signal for each identified speech segment; and responsive to the $D_{2q}$ correspondence signals for the plurality of identified speech segments, selecting the identity of the identified speech segment having the minimum $D_{2q}$ correspondence signal as the identity of the unknown speech segment.

11. A method for identifying an unknown speech segment in a continuous speech signal as one of a plurality of identified speech segments according to claim 10 wherein the unknown speech segment comprises an unknown spoken digit in a string of spoken digits and said identified speech segments comprise prescribed identified spoken digits.

12. A speech recognizer for identifying a string of unknown spoken digits comprising means responsive to said string of unknown spoken digits for partitioning said string into its component digits, means responsive to each partitioned unknown digit for generating a set of test signals $a(n)_i$ respresentative of the linear prediction coefficients of the voiced regions of said partitioned unknown digit where $n = 1, 2, \ldots, p$ is the order of the coefficient and signal $R_i$ representative of the autocorrelation coefficients of said partitioned unknown digit where $i = 1, 2, \ldots, Nv$ is the $i^{th}$ frame of unknown digit voiced region of $Nv$ frames, means for storing a set of reference characteristics for each possible identified digit representative of the mean values $m_{iq}$ of the linear prediction coefficients and the covariance $S_{iq}$ of said linear prediction coefficients of the average voiced regions of a plurality of repetitions of strings of said possible identified digits, where $i = 1, 2, \ldots \overline{N}v$ is the $i^{th}$ frame of the identified digit average voiced region of the $\overline{N}v$ frames and $q = 1, 2, \ldots Q$ is the identity of said identified digit, means for determining the correspondence between said test signals and each possible digit reference signals comprising means for time aligning said partitioned unknown digit test signals $a(n)_i$ for the unknown voiced region frames $i = 1, 2, \ldots Nv$ to the average voiced region frames $i = 1, 2, \ldots \overline{N}v$ of said identified digit reference signals to form a set of $\overline{N}v$ aligned test signals $a'_i$ corresponding to said $Nv$ test signals $a(n)_i$, means jointly responsive to said time aligned voiced region test signals $a'_i$ and said possible identified digit voiced region reference signals $m_{iq}$ for generating a signal $$D_{1q} = \frac{1}{\overline{N}v} \sum_{i=1}^{\overline{N}v} (\hat{a}'_i - \underline{m}_{iq}) R_i^{-1} (\hat{a}'_i R_i \hat{a}'^t_i)(\hat{a}'_i - \underline{m}_{iq})^t$$

representative of the correspondence between said time aligned voiced region test signals $a'_i$ and said identified digit voiced region reference signals $m_{iq}$, means for selecting the identified digit having the minimum $D_{1q}$ signal;

means for producing a signal classifying the beginning frame of said unknown spoken digit one of voiced, unvoiced and silence, means jointly responsive to said classification signal and the identity of said selected identified digit for generating a first signal when said classification signal is consistent with said selected digit identity, means responsive to said first signal for identifying said unknown digit as the selected identified digit, means jointly responsive to said classification signal and said selected identified digit for generating a second signal when said classification signal is inconsistent with said minimum $D_{1q}$ signal identity, means responsive to said second signal for forming a $$D_{2q} = \frac{1}{\overline{N}v} \sum_{i=1}^{\overline{N}v} (\hat{a}'_i - \underline{m}_{iq})(S_{iq} + \frac{R_i^{-1}(\hat{a}'_i R_i \hat{a}'^t_i)}{N})(\hat{a}'_i - \underline{m}_{iq})^t$$

correspondence signal for each identified digit $q = 1, 2, \ldots, Q$, and means for selecting the minimum $D_{2q}$ correspondence signal to identify the partitioned unknown digit as the identified digit having the minimum $D_{2q}$ correspondence signal.

13. A speech recognizer according to claim 12 wherein test signal generating means comprises means for generating a set of test signals representative of the linear prediction coefficients of the string of unknown spoken digits, means for detecting the voiced regions of each partitioned unknown digit, and means responsive to said detected voiced regions for selecting the test signals of said voiced regions from the test signals of the string of unknown spoken digits.

14. A speech recognizer according to claim 13 wherein said partitioning means comprises means responsive to said string of unknown spoken digits for generating a signal in each speech frame of said string representative of the classification of said speech frame as one of voiced speech, unvoiced speech, and silence, means responsive to said string of unknown spoken digits for generating a signal in each speech frame of said string representative of the speech energy in said frame; and means jointly responsive to said classification signals and said speech energy signals for identifying the unknown digit boundary frames.

15. A speech recognizer according to claim 14 wherein said boundary frame identifying means comprises means for scanning said classification signals, means for detecting each one of said unvoiced and silence frames immediately succeeding a voiced frame as a digit boundary frame, means for comparing the number of digit boundary frames with the number of unknown digits, means responsive to the number of boundary frames being less than said number of unknown digits for scanning said energy signals to detect minima energy frames, and means for identifying said energy minima frames as digit boundary frames until the number of digit boundary frames equals the number of unknown digits in the string.

* * * * *